(12) United States Patent
Büchler

(10) Patent No.: US 7,499,382 B2
(45) Date of Patent: Mar. 3, 2009

(54) METHOD FOR GAIN ADJUSTMENT FOR PRODUCTION OF A LENS POSITION SIGNAL, AND A CORRESPONDING APPLIANCE FOR READING FROM AND/OR WRITING TO AN OPTICAL RECORDING MEDIUM

(75) Inventor: Christian Büchler, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 363 days.

(21) Appl. No.: 10/556,767

(22) PCT Filed: May 14, 2004

(86) PCT No.: PCT/EP2004/005196

§ 371 (c)(1),
(2), (4) Date: Nov. 16, 2005

(87) PCT Pub. No.: WO2004/102545

PCT Pub. Date: Nov. 25, 2004

(65) Prior Publication Data

US 2007/0104048 A1     May 10, 2007

(30) Foreign Application Priority Data

May 16, 2003    (DE) ................................ 103 22 425

(51) Int. Cl.
*G11B 7/00*      (2006.01)
(52) U.S. Cl. .............. 369/44.35; 369/44.29; 369/44.41; 369/44.28
(58) Field of Classification Search ........................ None
See application file for complete search history.

(56) References Cited

U.S. PATENT DOCUMENTS 4,858,216 A     8/1989    Kamiya (Continued)

FOREIGN PATENT DOCUMENTS

EP      1022730      7/2000

(Continued)

OTHER PUBLICATIONS

Search Report Dated Aug. 5, 2004.

*Primary Examiner*—Muhammad N. Edun
(74) *Attorney, Agent, or Firm*—Joseph J. Laks; Robert B. Levy; Jorge Tony Villabon

(57) ABSTRACT

A lens position signal LCE which indicates the discrepancy between the lens and its geometric mid-position is required for coarse tracking of optical storage drives. The prior art is for the lens position signal LCE to be formed in three-beam pick-ups by weighted combination of specific photodetector signals from a primary beam and secondary beam. The only way to ensure that the lens position signal is free of crosstalk caused by the tracking error signal is for the weights to be set correctly. The invention describes methods by means of which the weights can be adjusted automatically and can be matched to the characteristics of the pick-up and of the respective storage medium. The amplitudes of those components in the main and secondary beam signals which are dependent on the tracking error are measured, and the matched weights are determined from them by joint evaluation. Evaluations with synchronous detection and with time integration are described, some of which can be used during writing and reading.

13 Claims, 18 Drawing Sheets

U.S. PATENT DOCUMENTS

| | | | |
|---|---|---|---|
| 5,721,717 A * | 2/1998 | Obata et al. | 369/44.27 |
| 5,764,605 A | 6/1998 | Zucker et al. | |
| 5,828,637 A | 10/1998 | Kim | |
| 6,282,158 B1 | 8/2001 | Kuroiwa | |
| 7,151,719 B2 * | 12/2006 | Buchler et al. | 369/44.13 |
| 7,280,458 B2 * | 10/2007 | Lee et al. | 369/112.12 |
| 2002/0021632 A1 | 2/2002 | Park | |
| 2002/0048235 A1 | 4/2002 | Park | |

FOREIGN PATENT DOCUMENTS

| | | |
|---|---|---|
| WO | WO 02/49023 | 6/2002 |

* cited by examiner

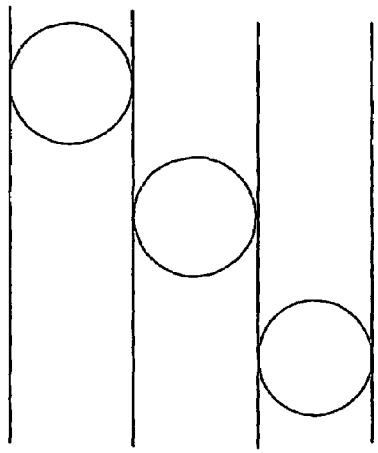
Fig.4
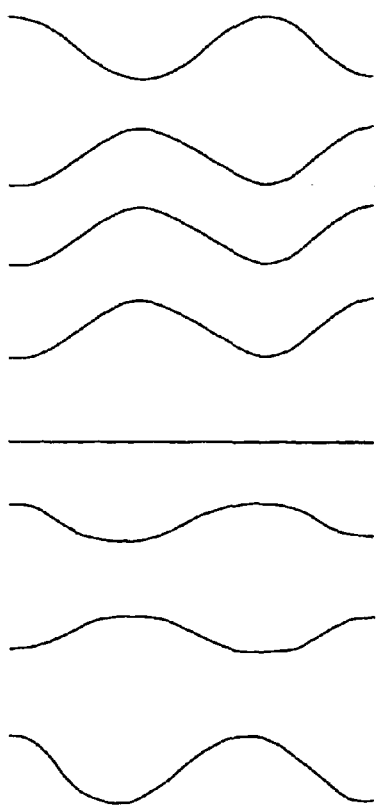
CPP
OPP1
OPP2
0,5 · (OPP1+OPP2)
LCE = CCP + 0,5·(OPP1+OPP2)   4A
LCE = CCP + 0,25·(OPP1+OPP2)   4B
LCE = CCP + 0,75·(OPP1+OPP2)   4C
DPP = CCP - 0,5·(OPP1+OPP2)   4D

METHOD FOR GAIN ADJUSTMENT FOR PRODUCTION OF A LENS POSITION SIGNAL, AND A CORRESPONDING APPLIANCE FOR READING FROM AND/OR WRITING TO AN OPTICAL RECORDING MEDIUM

The present invention relates to a method for gain adjustment for production of a lens position signal which describes the position of the optical axis of an objective lens of an appliance for reading from and/or writing to an optical recording medium with respect to the optical axis of an optical scanner which is used in this appliance, and to a correspondingly designed appliance for reading from and/or writing to an optical recording medium.

Conventionally, a tracking error signal which can be used for tracking control in the respective appliance is produced in appliances for reading from and/or writing to optical recording media, such as optical recording media like DVD-RAM in which information tracks are contained both in depressions also called grooves G, and in elevations also called lands L. One of the more widely used methods for forming the tracking error signal is the so-called "differential push-pull" (DPP) method, as is described by way of example in EP 0 745 982 A2. In this case, the laser beam that is emitted from a laser diode is split into three beams, specifically a main beam and two secondary beams, which scan mutually adjacent tracks of the respectively used optical recording medium. The main and secondary beams which are reflected from the optical recording medium are evaluated in order to obtain main beam and secondary beam tracking error signals which are dependent on them, and from which the desired tracking error signal is generated by suitable combination.

Figure 15:
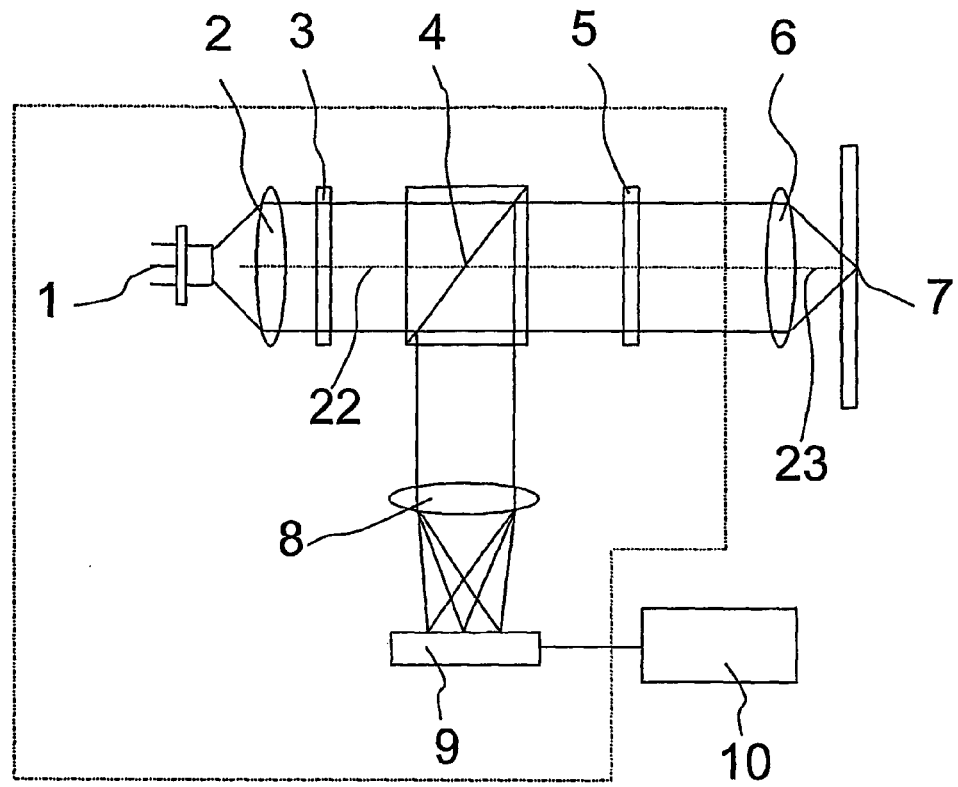

An appropriate arrangement is illustrated by way of example in FIG. 15. The light which is emitted from a light source or from a laser 1 is split, after passing through a collimator lens 2, by a diffraction grating 3 into the main beam (that is to say into a 0th-order beam) and the two secondary beams (that is to say ±1st-order beams). The main beam, which reads the information to be scanned in one track on a corresponding recording medium 7, normally contains the majority (approximately 80-90%) of the light information. The two secondary beams each contain the remaining approximately 5-10% of the total light intensity, in which case it is assumed, for the sake of simplicity, that the light energy in the higher diffraction orders of the diffraction grating 3 is zero.

These three beams are focused via a polarizing beam splitter 4 and a quarter-wave plate 5 as well as an objective lens 6 on the optical recording medium 7, in order to read from it and to write to it. The three beams which are reflected from the optical recording medium 7 are fed via the beam splitter 4 and a cylindrical lens 8 to a photodetector unit 9, which detects the three beams reflected from the optical recording medium 7. The three beams are indicated symbolically in the figure between the cylindrical lens 8 and the photodetector unit 9. The photodetector unit 9 is connected to an evaluation unit 10, which evaluates the detected signals from the reflected main and secondary beams in order to produce the tracking error signal.

The diffraction grating 3 is installed such that the images of the two secondary beams actually scan the center of the adjacent tracks or (in the case of medium which can be written to only in groove tracks) the center of the area alongside the track being scanned by the main beam. Since it is intended that the secondary beams and the main beam should be optically separable from one another, their images on the optical recording medium 7 and on the photodetector unit 9 are at separate positions from one another. If the optical recording medium 7 is rotated, then one of the secondary beams is located in front of the main beam, and the other secondary beam is located behind it, in the reading or writing direction. The evaluation unit 10 in the arrangement shown in FIG. 15 evaluates the light intensities reflected onto the photodetector 9 separately for each of the three beams.

A push-pull signal, which represents the tracking error of the respective beam with respect to the track, is produced both from the detected signals for the main beam and for the secondary beams, in each case in their own right, in the evaluation unit 10. Since the two secondary beams scan the adjacent tracks alongside the writing/reading track, however, their push-pull tracking error is the inverse of that of the main beam. Each of the push-pull components considered in their own right thus contain the actual tracking error for the respectively scanned track. Since the track position of the three beams can change only jointly, the three push-pull signals change in the same way.

The objective lens 6 of an optical scanner 21 as sketched in FIG. 15 must be mounted such that it can move, in order to allow the scanning beam to be focused, and to be held on a predetermined track, even in the case of an optical recording medium 7 which has a vertical misalignment and/or eccentricity. That part of the scanner 21 which comprises the elements 2, 3, 4, 5, 8, 9 in this case defines an optical axis 22. The objective lens 6 is ideally arranged in its rest position such that its optical axis 23 coincides with the optical axis 22 of the other optical components of the optical scanner 21.

The movement of the objective lens 6 is normally achieved by means of an electromagnetic drive. The objective lens is in this case held in a predetermined rest position by an arrangement of links and/or springs, and it can be deflected from its rest position by application of a current to the electromagnetic drive. The evaluation unit 10 provides tracking error and focus error signals for this purpose, which describe the position of the objective lens 6 and allow this to be corrected with the aid of control loops.

When a continuous scanning process is carried out on an optical recording medium 7 with tracks applied in a spiral shape, the objective lens 6 is deflected to an increasing extent. In the process, its optical axis 23 is moved increasingly away from the optical axis 22 of the other optical components. In order to counteract this movement of the optical axes with respect to one another, an actuating motor or linear motor having a further control loop is normally provided, which readjusts the scanner 21 with the optical components 2, 3, 4, 5, 8, 9 installed in it, such that the optical axes differ as little as possible from one another. This motor is normally referred to as the coarse tracking motor CTM. According to the prior art, the drive voltage for the electromagnetic drive for the objective lens is used as a criterion for the discrepancies between the optical axes. This is based on the assumption that the optical axis 23 of the objective lens 6 coincides with that of the other optical components when no current is flowing through the electromagnetic drive.

Since the objective lens is mounted on a spring suspension system, this assumption is not correct in all operational situations. For example, the objective lens changes its position even without any drive to the drive coils when external forces act on it, such as those which can occur when a shock is applied to the player. Furthermore, aging of the links or springs can change the rest position of the objective lens, so that the optical axes differ from one another. These effects cannot be described using the drive voltage for the drive coils.

If now, by way of example, the objective lens 6 is moved during a track change, then the images of the main and secondary beams on the photodetector unit 9 also move. This movement of the image results in an offset voltage at the output of the evaluation unit 10, with the direction of this offset voltage being the same for all the beams. The movement of the objective lens 6 thus results in an offset voltage which is not based on an actual tracking error, and is thus disturbing. The real tracking error component and the undesirable lens movement-dependent component are added in the push-pull signal which is detected by the respective detectors of the photodetector unit 9 and is produced by the evaluation unit 10.

If the push-pull signals for the secondary beams are now added, and this sum is subtracted from the push-pull signal for the main beam, then this undesirable component, which is dependent on the lens movement, is canceled out if appropriate gain is applied to the main and secondary beam components. Since the tracking error components of the main and secondary beams are inverted with respect to one another, these are on the other hand added in phase after the subtraction process has been applied, so that the actual tracking error is obtained if the gain factor is set correctly. By way of example, EP 0 708 961 B1 describes a method for determining a suitable gain factor.

It is evident from the characteristics of the conventional DPP method described above, that the phase shift between the tracking error components of the main beam and of the secondary beams is nominally 180 degrees, owing to the position of the secondary beams. This is advantageous since the subtraction process results in the tracking error components of the main beam and of the secondary beams being added. If the position of the beams on the tracks is considered, then the angle of the diffraction grating 3 for reaching the maximum amplitude of the tracking error signal is set precisely such that (for example in the case of a DVD-RAM) the secondary beams strike the track centers of the adjacent tracks or (in the case of media which can be written to only in groove tracks) precisely the area between two tracks, alongside the track which is being scanned by the main beam.

The aim of the DPP method described above is to form a tracking error signal which has no component that is dependent on lens movement. The process of linking the push-pull signals of the main beam and of the secondary beams as described above admittedly allows the actual tracking error to be obtained but, owing to the cancellation of the component that is dependent on lens movement, it is in this case no longer possible to describe the position of the objective lens 6 with respect to the optical axis of the scanner.

During a tracking process, the objective lens 6 is moved at right angles to the track direction of the optical recording medium 7, that is to say the optical axis of the objective lens 6 is moved away from the optical axis of the scanner 21. This results in a corresponding shift in the image of the reflected scanning beam on the detector elements of the photodetector unit 9. If the already described DPP method is used for track control, this admittedly results in the respectively scanned track being followed correctly, but the evaluation unit 10 cannot in this case identify the fact that the optical axes of the objective lens 6 and scanner 21 do not match.

In fact, a lens position signal must for this purpose be formed from the push-pull signals for the secondary beams and the push-pull signal for the main beam. This makes it possible to describe the position of the objective lens 6 with respect to the optical axis 22 of the scanner 21. The lens position signal can likewise be used to provide the control unit of the appliance with auxiliary signals, which allow a positioning process to be carried out quickly, as is necessary for example for access to another piece of music on a CD.

It has already been proposed for the DPP method as described initially to be used for production of the lens position signal. In contrast to the situation when obtaining the tracking error signal using the DPP method according to the prior art, the push-pull signal for the secondary beams is in this case added to the push-pull signal for the main beam, in order to obtain the component which is dependent on the lens movement. In this case, a weighted addition process is carried out, in particular, in which case the weighting factor can be set to an ideal value as a function of the distance between the two secondary beams and the main beam, and the track separation. In addition, the signals which are derived from the beams that are used are normalized, in order to make it easier to adjust the weighting factor.

The present invention is now based on the object of describing a method and an appliance which adjusts the weighting factor as described above such that a lens position signal can be formed in which the tracking error components are suppressed as far as possible. The weighting factor setting is in this case advantageously determined while reading from or writing to an optical recording medium, so that changes to the weighting factor becoming necessary because of changes in the characteristics of the optical scanner during operation can be carried out immediately.

The invention is based on the idea that a lens position signal LCE is formed from the push-pull signals OPP of the secondary beams, and from the push-pull signal CPP of the main beam. The invention makes use of the fact that, if the main beam component CPP in the signal LCE is weighted too strongly or too weakly with respect to the secondary beam components OPP, the resultant signal LCE contains a component which is dependent on the tracking error, and which is in phase with or in antiphase with a tracking error signal DPP.

According to the invention, the amplitude of that component of the secondary beams which is dependent on the tracking error is for this purpose determined as a first measurement signal, and the amplitude of that component of the main beam which is dependent on the tracking error is determined as the second measurement signal, with these components being those which occur by passing through the various track positions. The two measurement signals are evaluated in order to calculate or set the weighting factor such that the components in the LCE signal which are dependent on the tracking error become zero. By way of example, the amplitudes of the already weighted main and secondary beam error signals are measured separately before they are added, and, if there is any difference, the weighting factor of the weaker signal is increased, and/or that of the stronger signal is reduced.

With other words: For the coarse tracking control CTC of optical record carrier drives a lens position signal LCE is needed, which indicates the deviation of the lens from its geometrical center position. According to prior art, the lens position signal LCE in three beam pickups is generated by a weighted combination of specific photo detector signals of the primary and secondary beam. Only a correct setting of the weights ensures that the lens position signal is free of crosstalk from the track error signal. The invention describes methods by which the weights can be automatically adjusted and matched to the properties of the pickup and the recording medium. The amplitudes of the track error dependent components of the main beam signal and the side beam signal are measured, and by a joint evaluation matched weights are derived from them. Evaluations using synchronous detection and temporal integration are described, some of which can be used during reading/writing operation.

Figure 1:
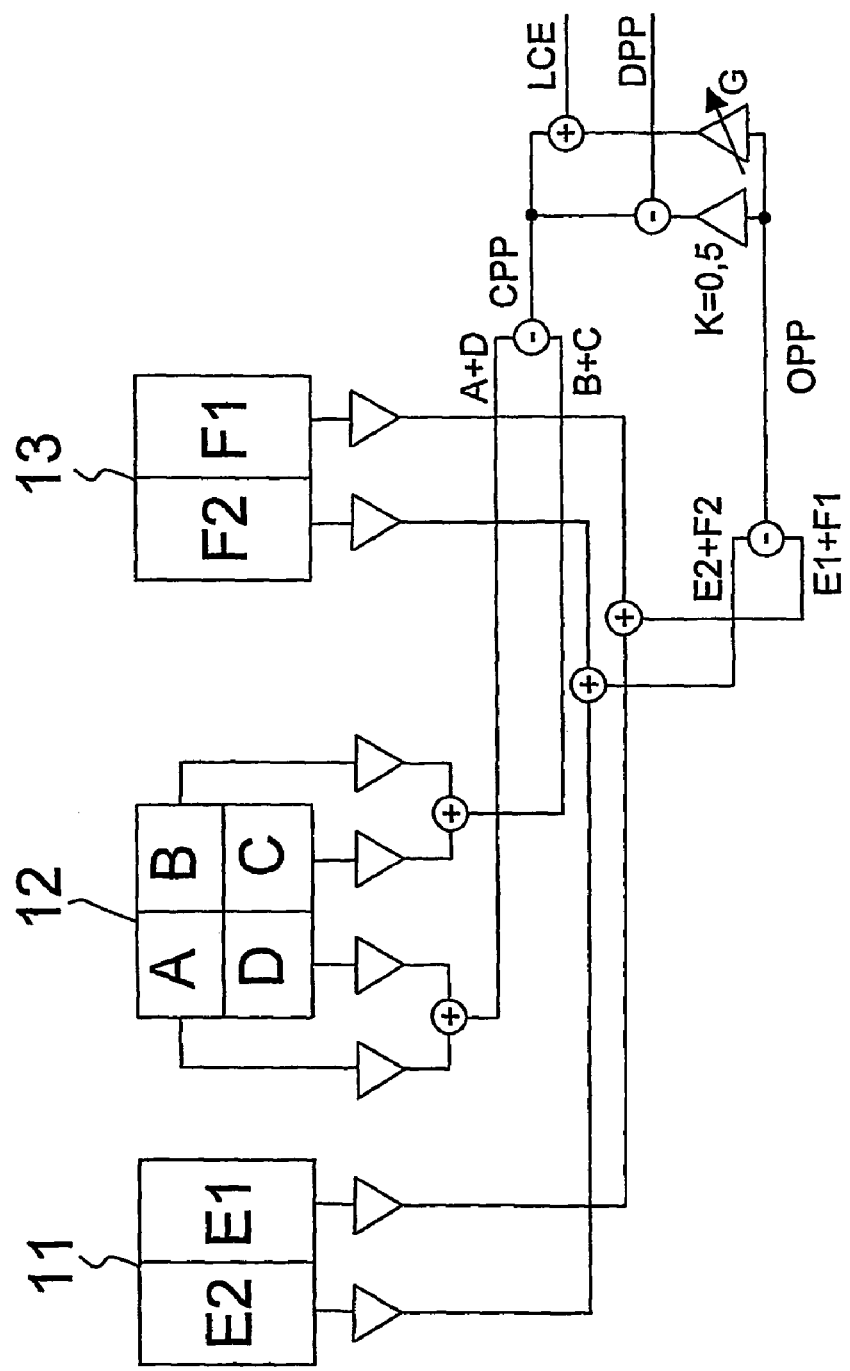
Figure 2:
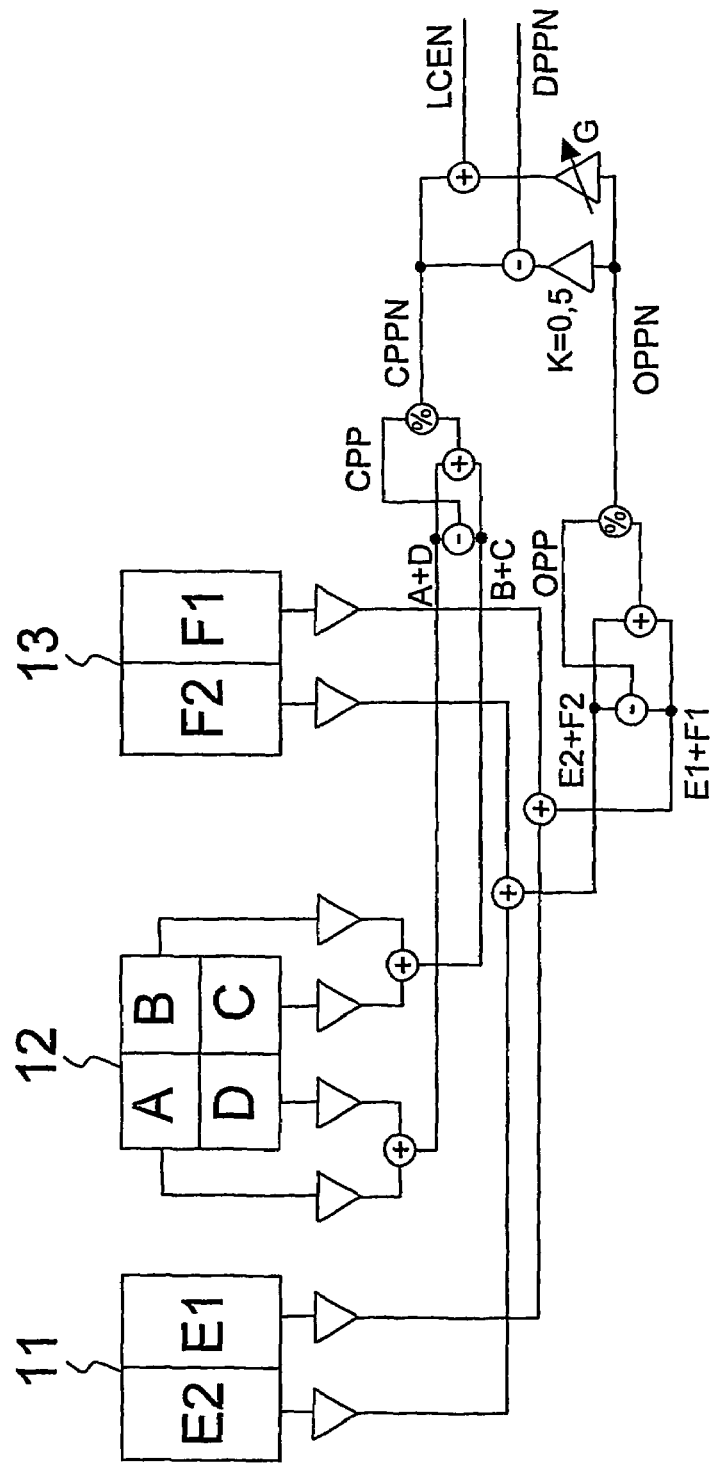
Figure 3:
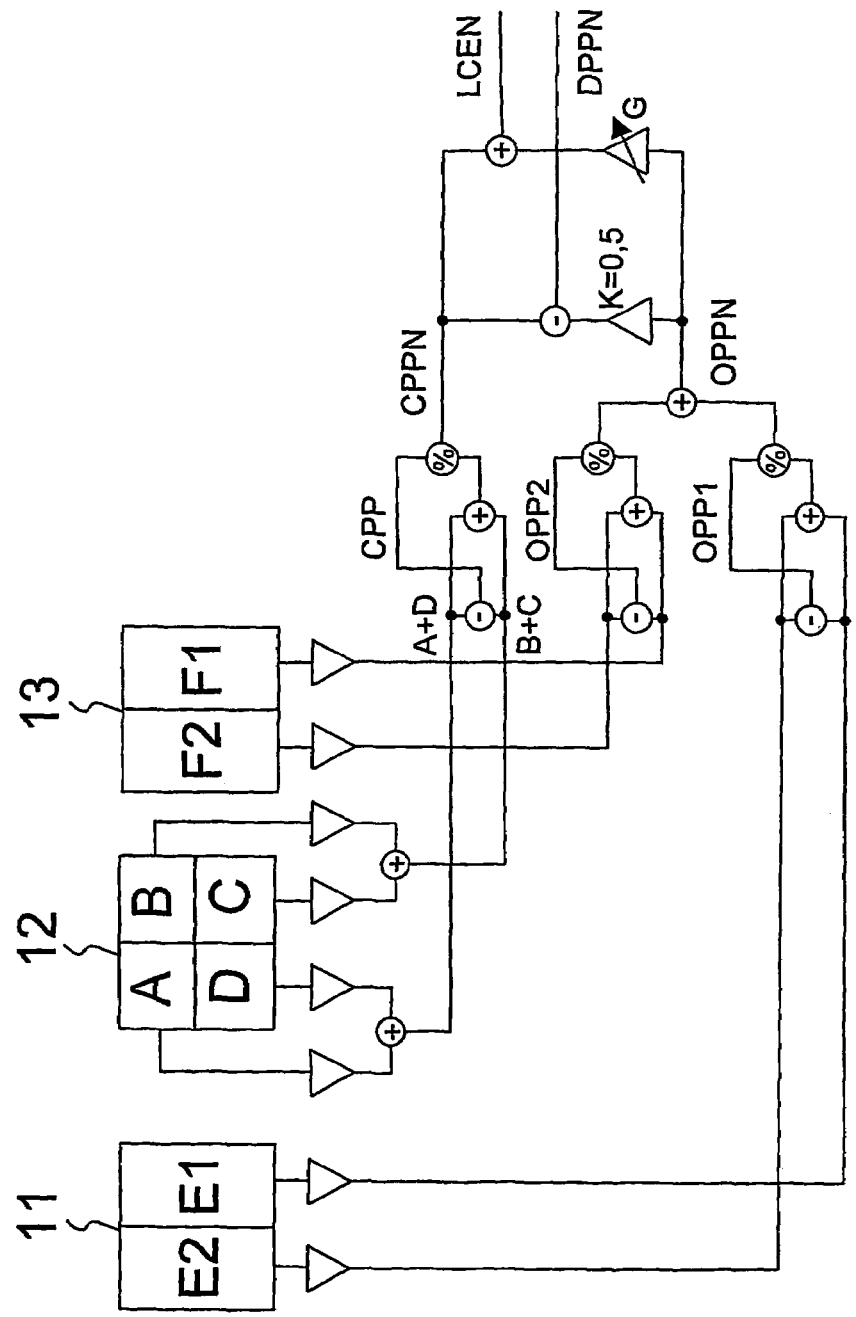

The present invention will be explained in more detail in the following text using preferred exemplary embodiments and with reference to the attached drawing, in which:

FIG. 1 shows an arrangement for production of a lens position signal according to the prior art, FIG. 2 shows a variant of the first arrangement shown in FIG. 1, in which the signals LCE and DPP that are produced are normalized, FIG. 3 shows a further variant of the arrangement shown in FIG. 2, with alternative normalization according to the prior art, FIG. 4 shows a track illustration with a beam arrangement of the main beam and of the secondary beams, and the push-pull signals obtained with this beam arrangement.

Figure 5:
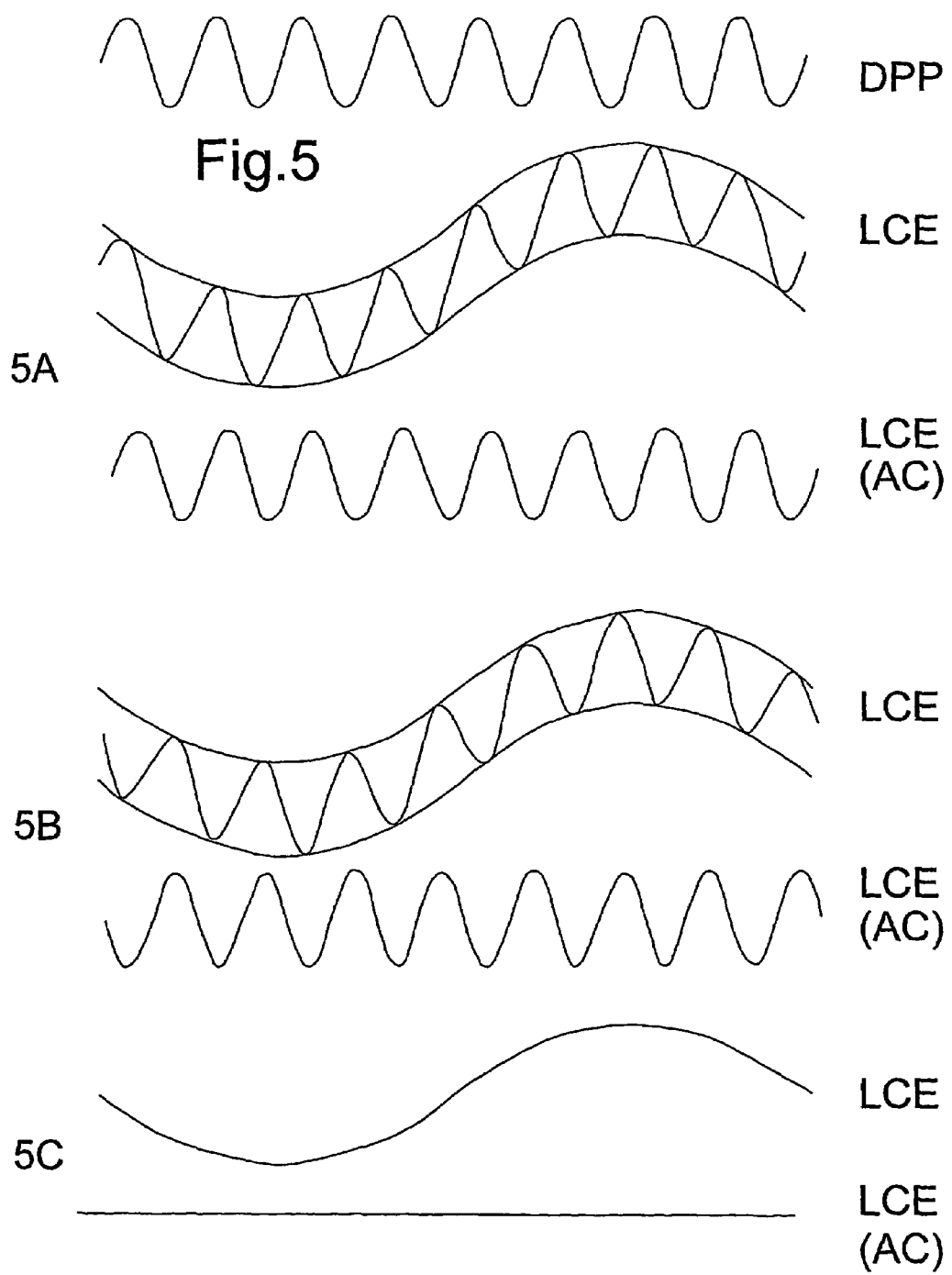
Figure 6:
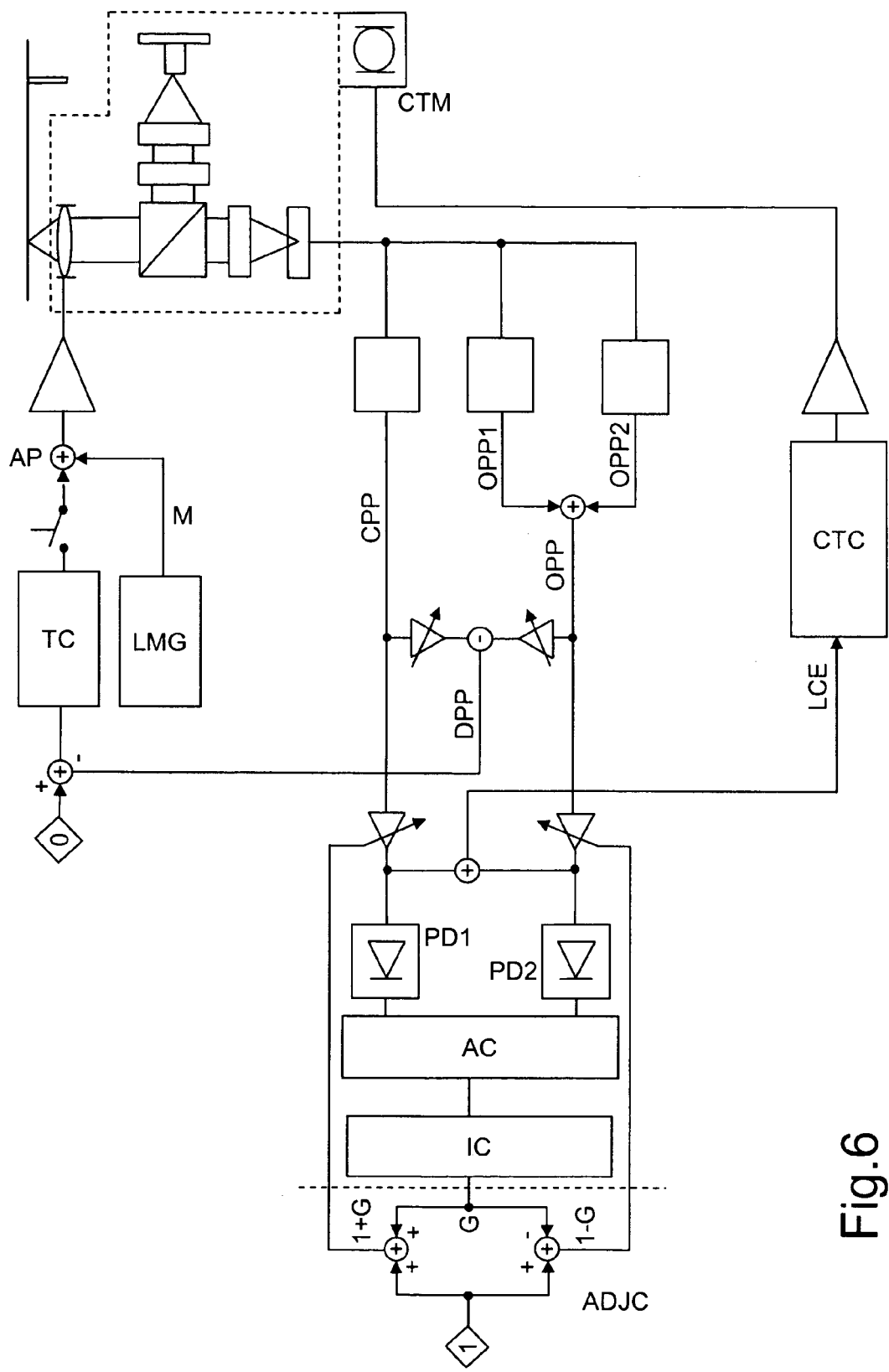
Figure 7:
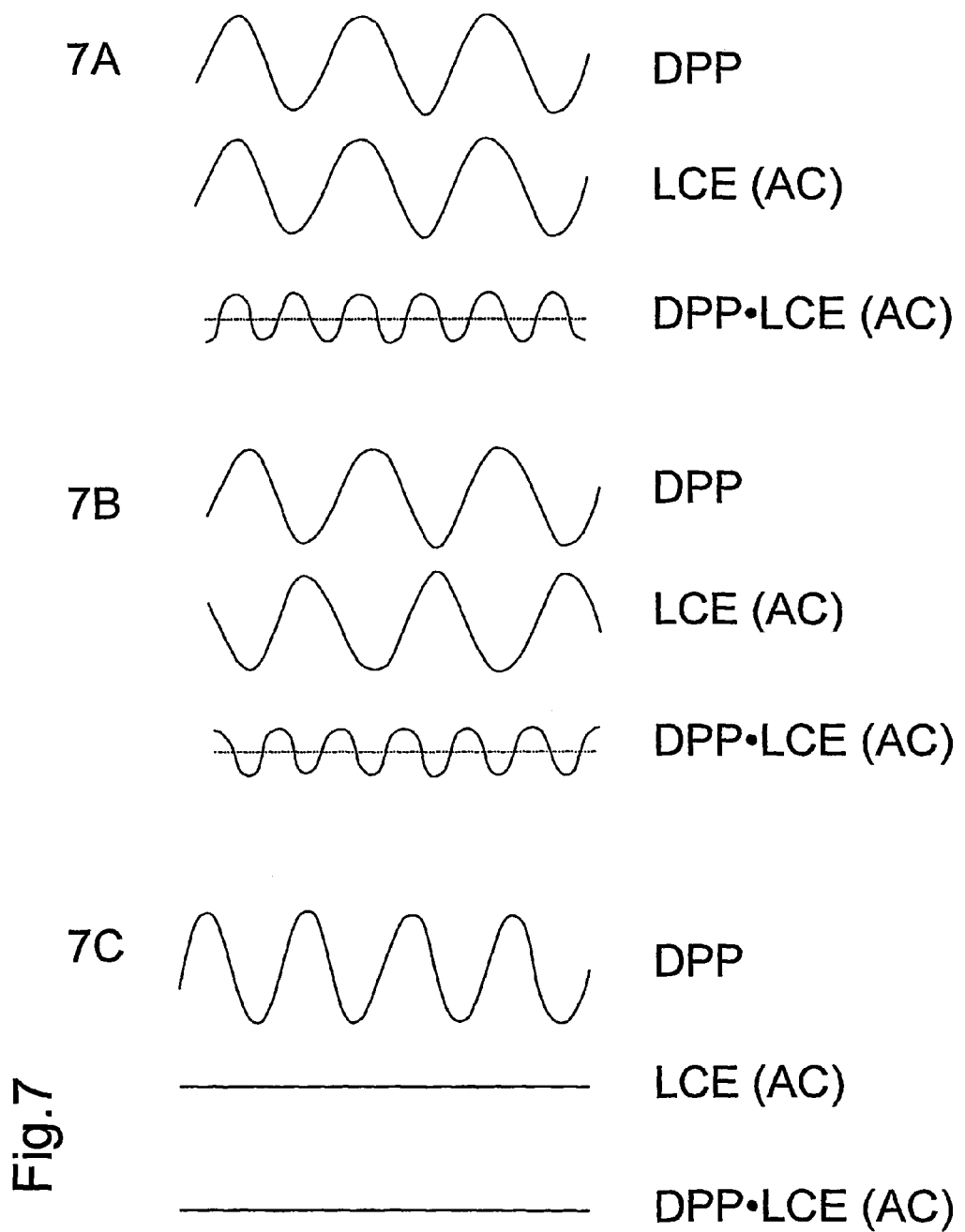
Figure 8:
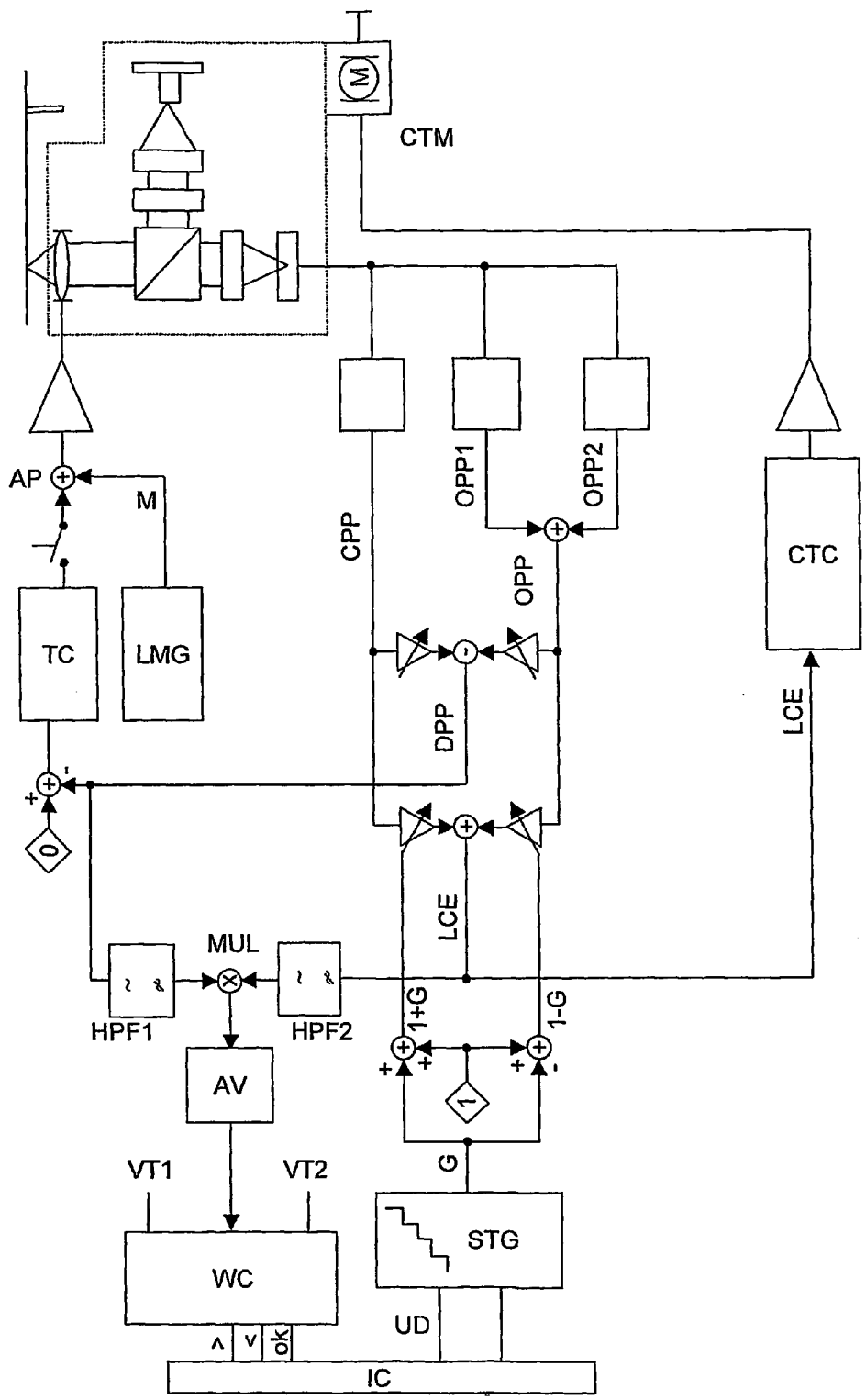
Figure 9:
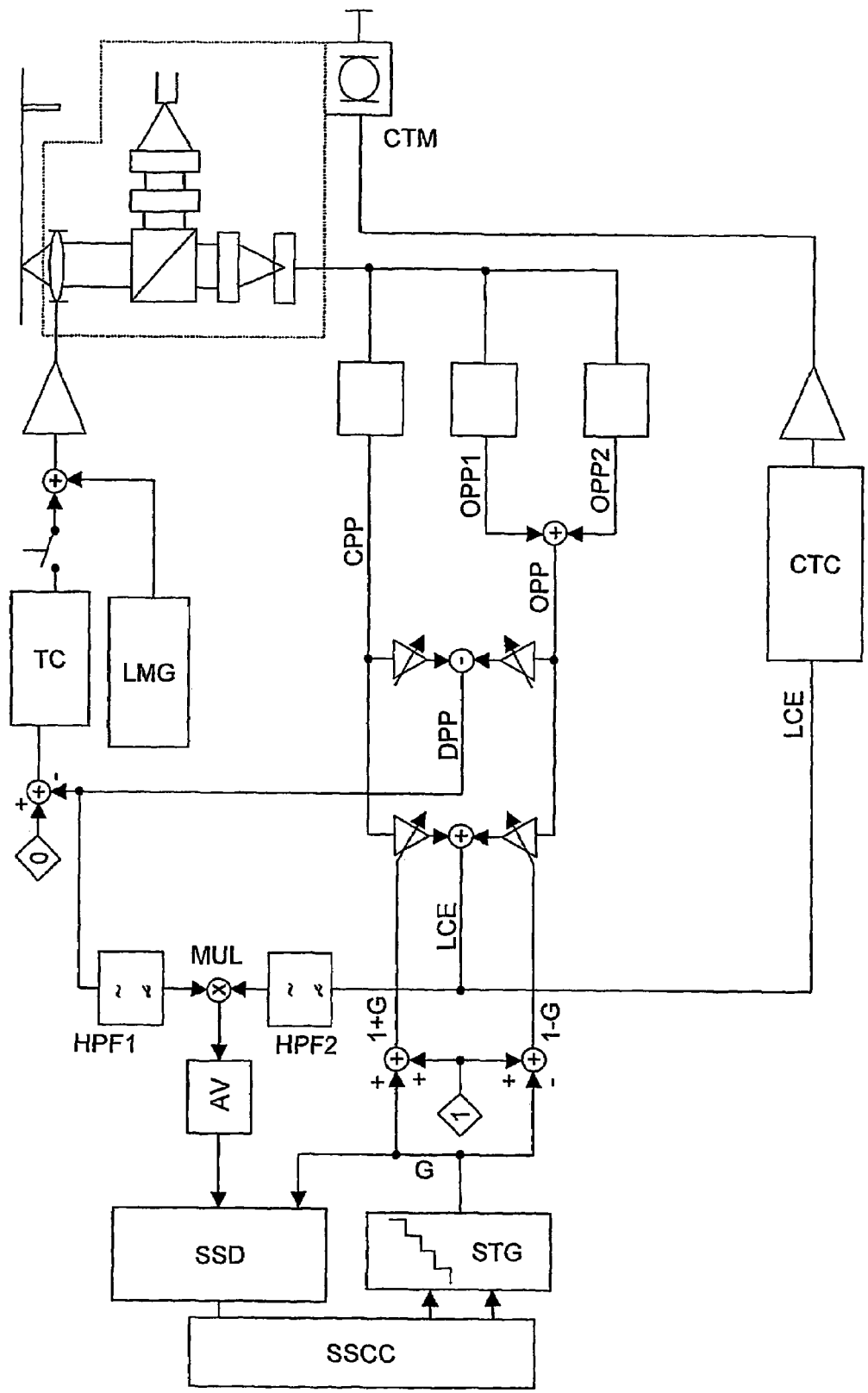
Figure 10:
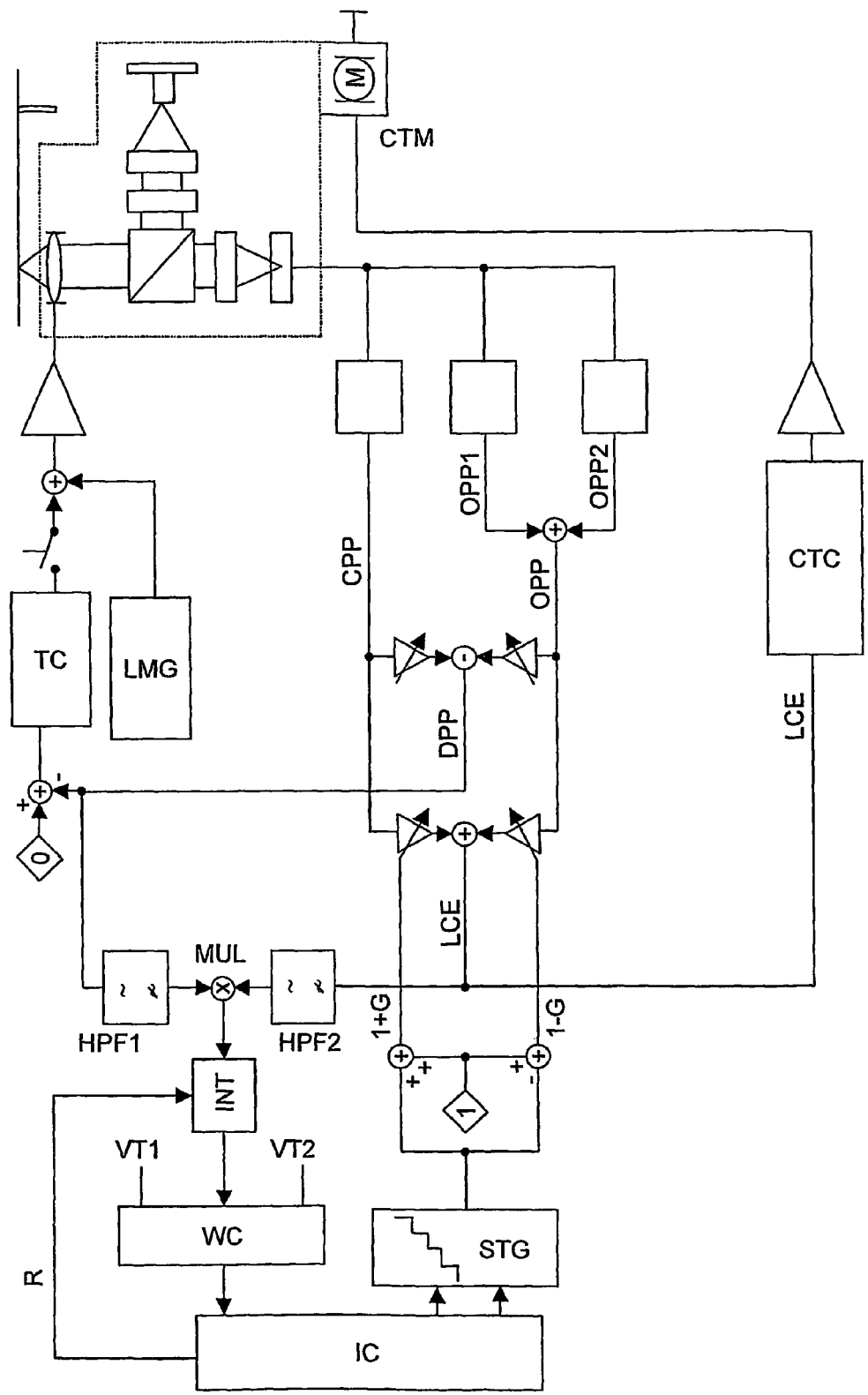
Figure 11:
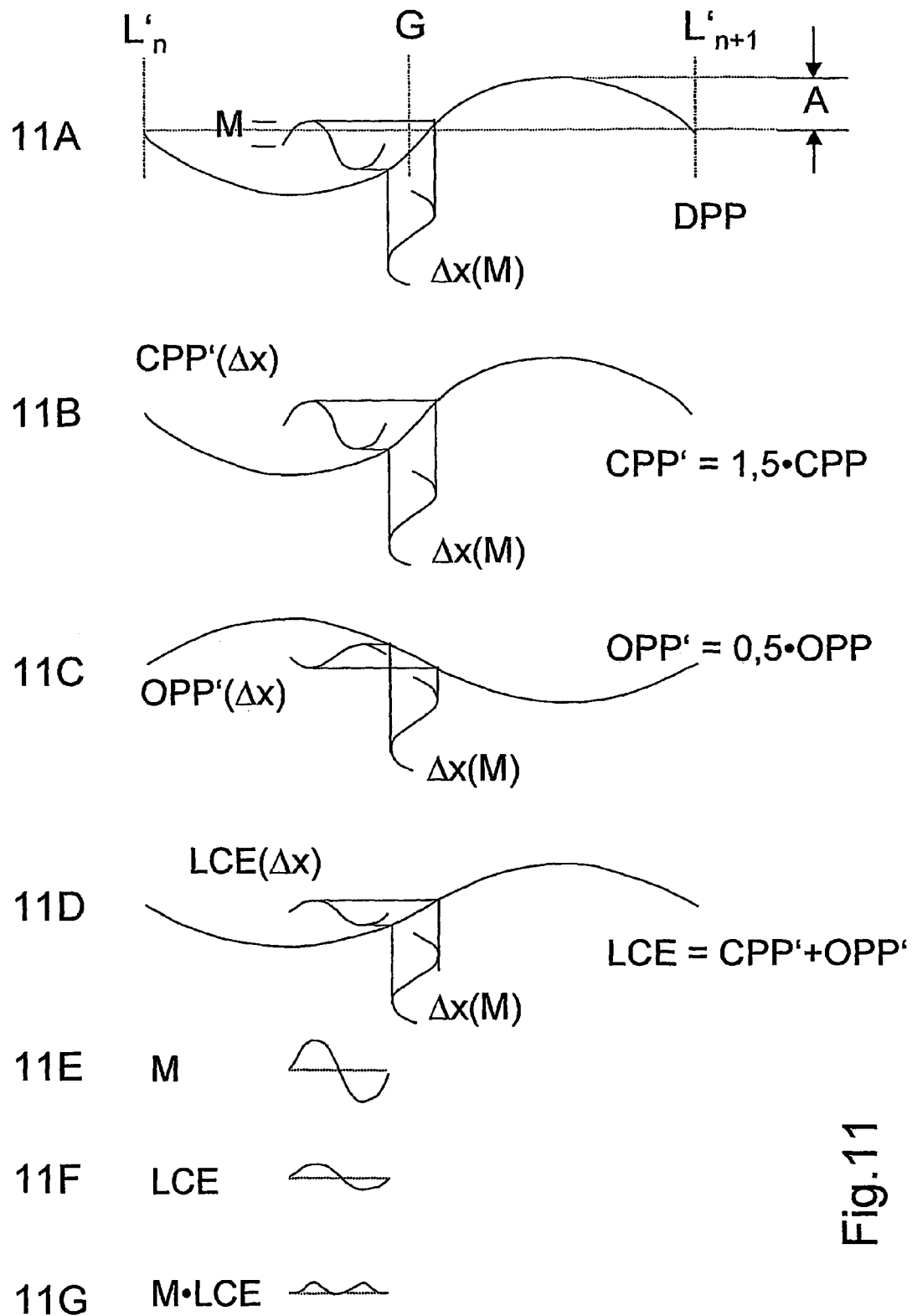
Figure 12:
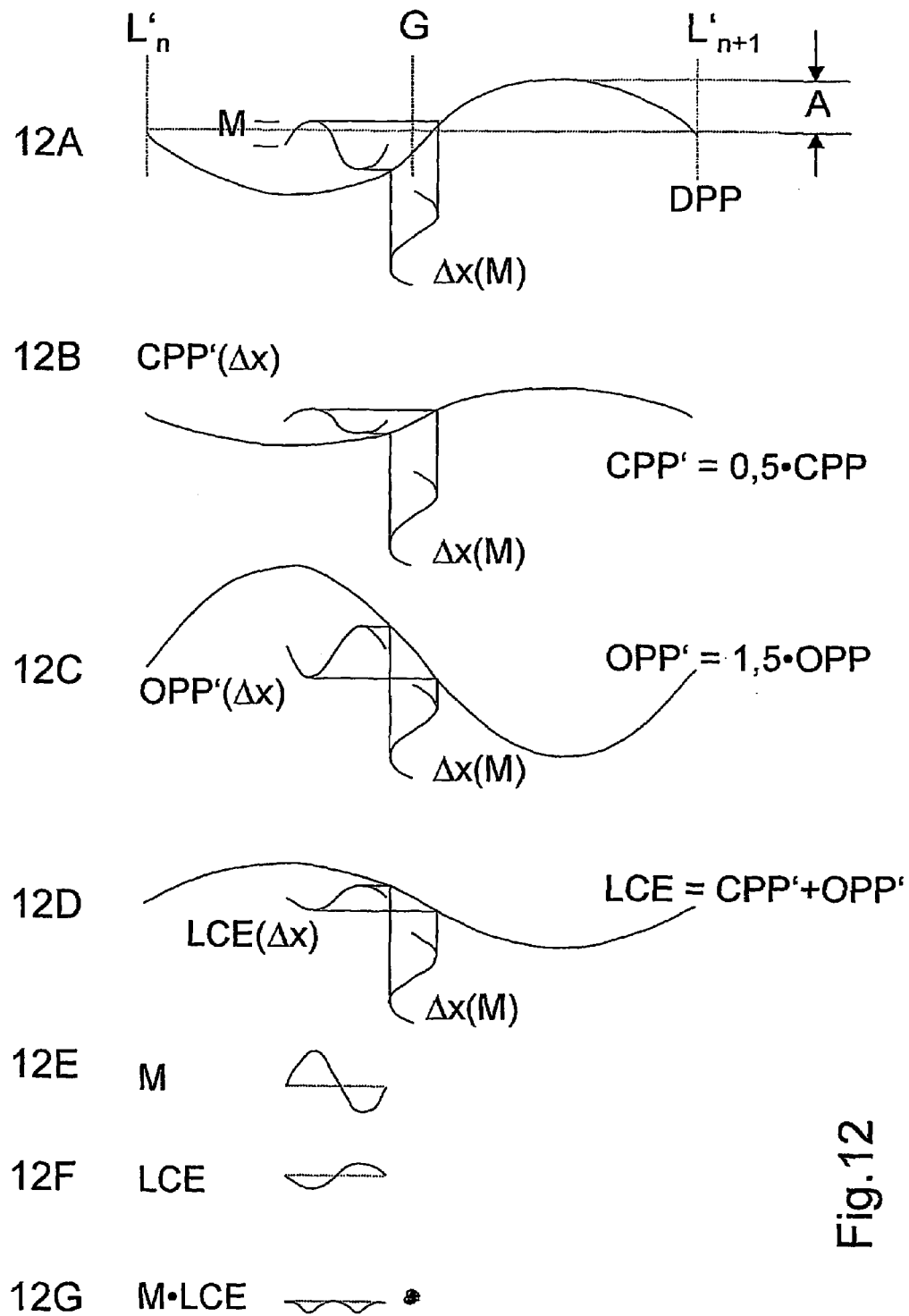
Figure 13:
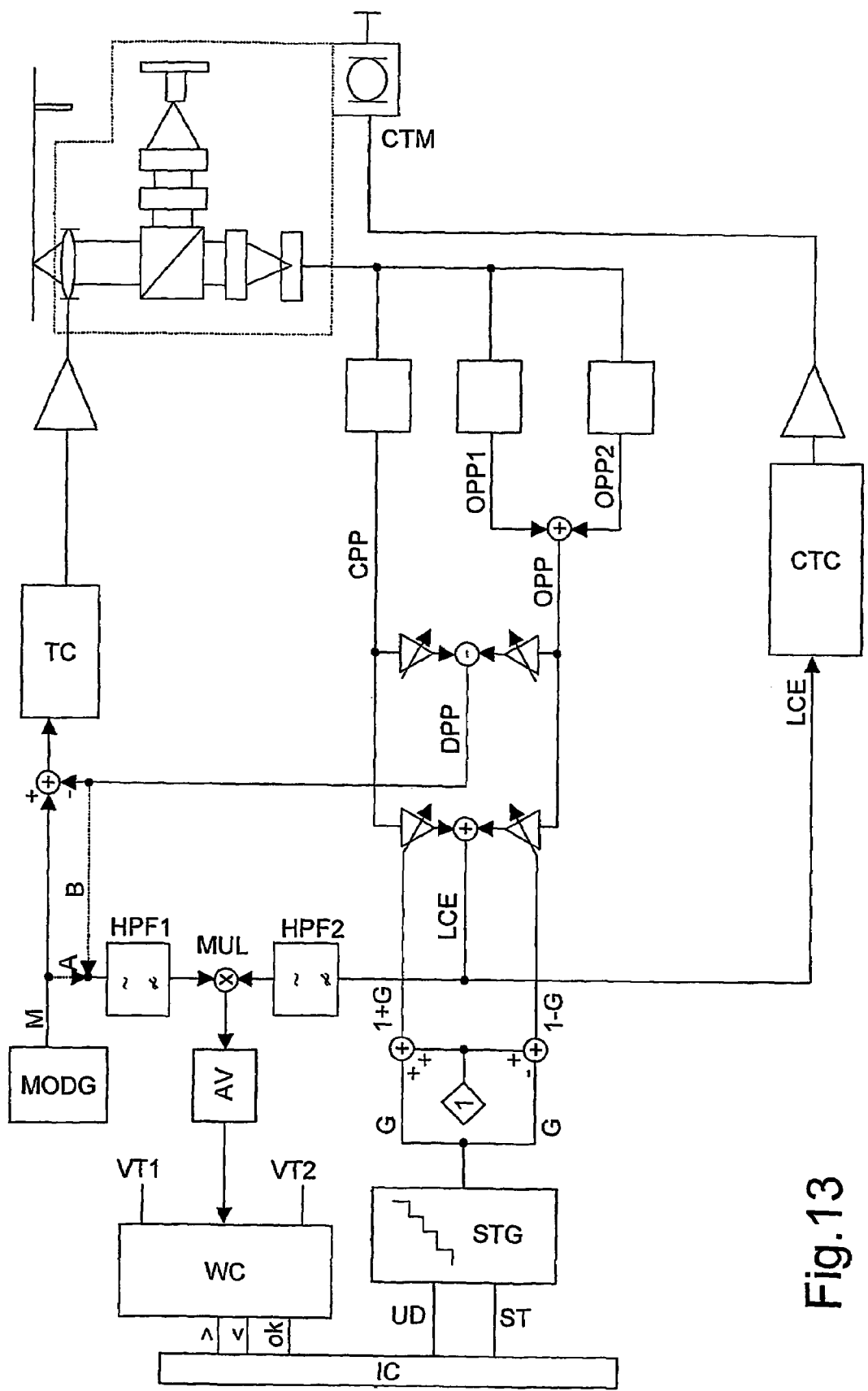

FIG. 5 shows a signal diagram, illustrating the lens position signal on deflection of the objective lens, FIG. 6 shows a first exemplary embodiment of the present invention for adjustment of the weighting in order to form the lens position signal, FIG. 7 shows, by way of example, a signal diagram, illustrating the lens position signal when the weighting is set incorrectly and correctly, FIG. 8 to FIG. 10 show further exemplary embodiments of the present invention relating to the setting of a weighting in order to form the lens position signal when the tracking control loop is deactivated, FIG. 11 and FIG. 12 show signal diagrams which illustrate the lens position signal when the weighting is set incorrectly and correctly and the tracking control loop is closed, FIG. 13 and FIG. 14 show exemplary embodiments of the present invention relating to the setting of a weighting in order to form the lens position signal when the tracking control loop is activated, and FIG. 15 shows a simplified configuration of an optical scanner for carrying out the DPP method according to the prior art, in which case this configuration can also be applied to the present invention.

Figure 16:
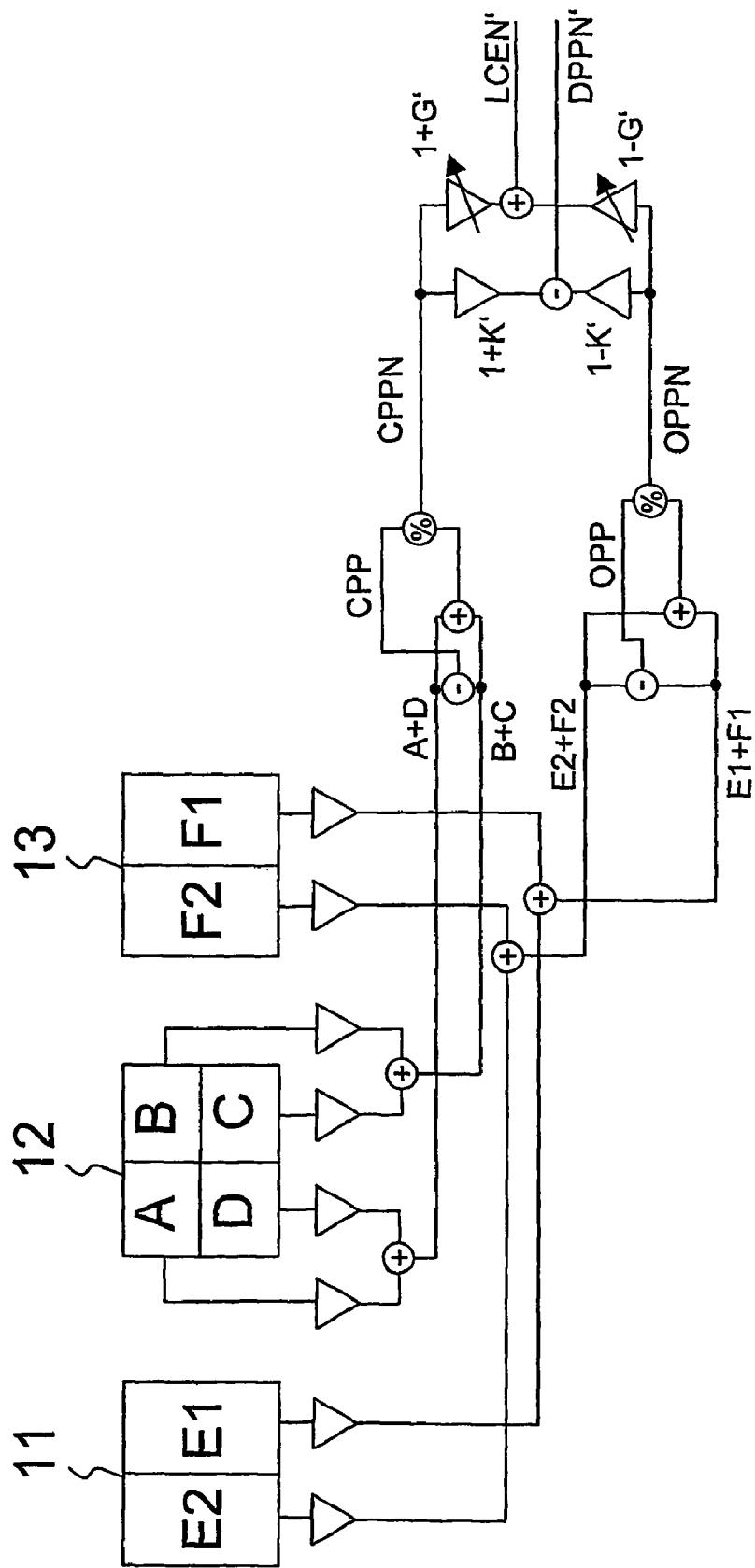
Figure 17:
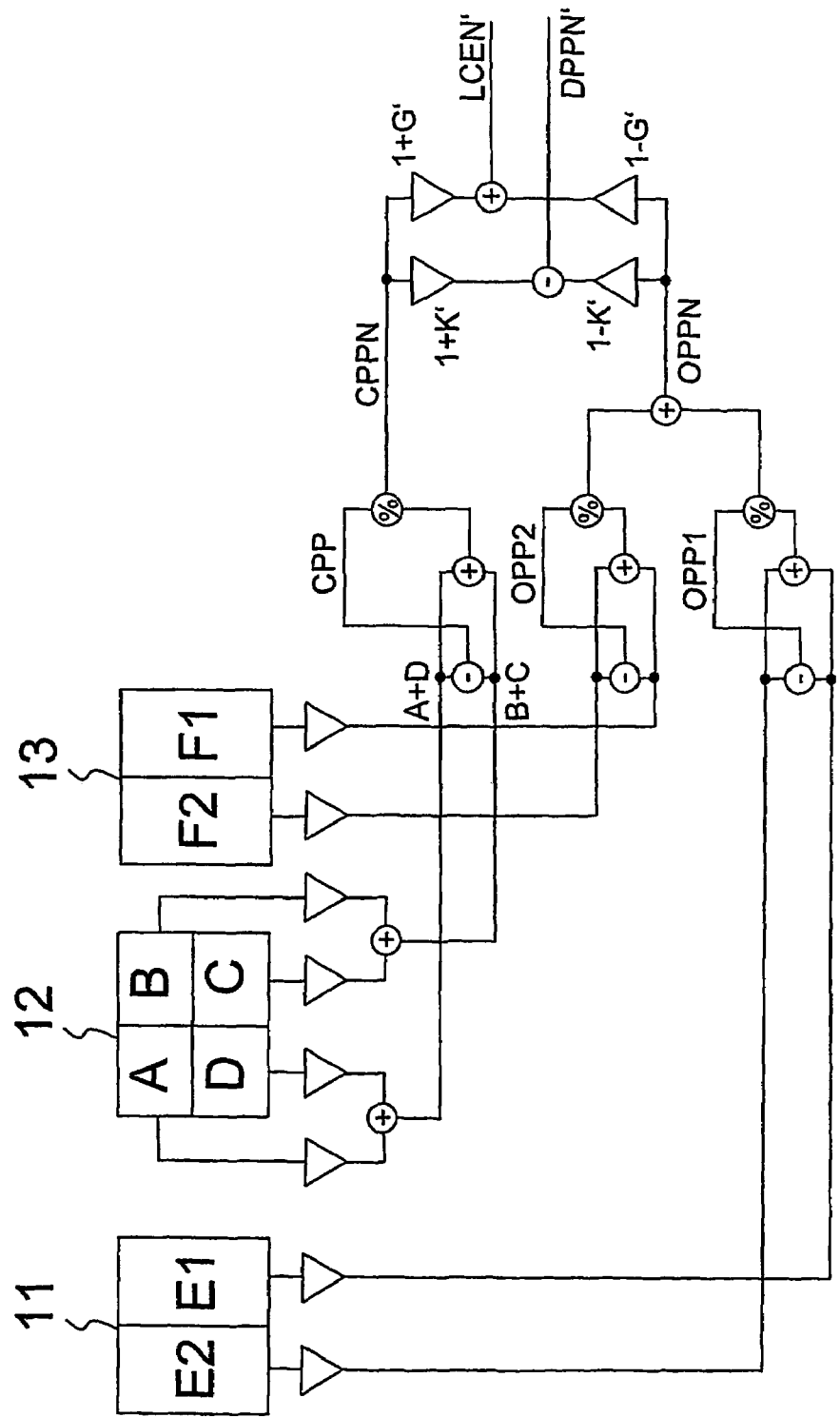

FIG. 16 shows a variant of the arrangement shown in FIG. 2, relating to the weighting between the main beam and the secondary beam; and FIG. 17 shows a variant of the arrangement shown in FIG. 3, relating to the weighting between the main beam and the secondary beam.

As has already been described initially, the tracking error signal generated according to the DPP method is composed of one component generated from the main beam and two other components generated from the secondary beams. According to the prior art, the components of the secondary beams are added, and the sum resulting from this is subtracted from the component of the main beam, with an appropriate weighting.

For all of the following statements, it is assumed for the sake of simplicity that the intensities of the three scanning beams being considered are the same when they arrive at the photodetector unit 9. However, in practice, the intensity of the secondary beams is dependent on their track position, on the reflection of the scanned track, and on the characteristics of the diffraction grating 3, and is weaker than the intensity of the main beam, so that the intensity of the secondary beams must be scaled to the main beam intensity. Ideally, this can be done by normalization.

The signals CPP and OPP, or alternatively the individual signals OPP1 and OPP2, may be normalized by dividing these signals by the sum signals which are proportional to the respective amount of light received by the detector surfaces. Such normalization (FIG. 1) is carried out, for example, in the evaluation unit 10.

On the basis of the exemplary embodiment shown in FIG. 1, FIGS. 2 and 3 show two further variants of a normalization process. FIG. 2 shows an exemplary embodiment where the main beam signal (CPP) and the sum (OPP) of the two secondary beam signals are each normalized individually. The normalized signals are in this case annotated CPPN, OPPN, LCEN and DPPN, i.e. with a suffix "N". FIG. 3 shows another exemplary embodiment in which the push-pull components of the three beams are normalized separately, before being used to form the signals LCE and DPP by weighted addition and subtraction.

As described above, the weighting factor G must be matched to the adjacent track separations. If, by way of example, the variant illustrated in FIG. 2 is used as the basis, then the signal amplitude of the signal LCE is dependent on the setting of the compensation factor G. This is avoided by a further variant of the variants which are shown in FIGS. 2 and 3, and which will be described in the following text.

The variant which is shown in FIGS. 16 and 17 relates to the weighting between the main beam and the secondary beams. By way of example, the single weighting factor G employed for the secondary beam signal only is in this case advantageously replaced by two weighting factors 1+G' and 1−G', which act on the main and secondary beam signals.

Splitting the weighting factor G into two weighting factors which are dependent on G' means that the amplitude of the signal LCE, which is dependent on the lens movement, is independent of the respective weighting factor to be set. In an analogous manner, the formula (1) can also be applied to the weighting factor K for forming the DPP signal. The factors G and K are, for example, chosen analogously to FIG. 2 and FIG. 3, respectively. The signals weighted in this way are annotated LCEN' and DPPN'.

Subject to the precondition described above, the following relationships apply, and in this context reference should also be made, for example, to the figure which will be described in more detail further below:

$$DPP = CPP - K * OPP \quad (1)$$

$$CPP = a * \sin\left(2\pi * \frac{x}{2p}\right) + kl \quad (2)$$

$$OPP = a * \left(\sin\left(2\pi * \frac{x + \Delta x}{2p}\right) + \sin\left(2\pi * \frac{x - \Delta x}{2p}\right)\right) + k(l + l) \quad (3)$$

$$= a * \left(\sin\left(2\pi * \frac{x + \Delta x}{2p}\right) + \sin\left(2\pi * \frac{x - \Delta x}{2p}\right)\right) + 2kl$$

In this case, DPP denotes the signal obtained using the DPP method, CPP denotes the corresponding component of the main beam, OPP denotes the component of the secondary beams, K denotes a weighting factor, x denotes the scanning position of a beam relative to the track center, Δx denotes the distance between the two secondary beams with respect to the main beam, and p denotes the track separation which in this case (in accordance with the definition based on the DVD-RAM Standard) is measured between the centers of two adjacent tracks. l denotes the movement of the objective lens 6 from the rest position. The amplitudes a and k are factors which depend on the geometry of the scanned tracks, on the sensitivity of the photodetector unit 9, etc. Since the three beams are mechanically coupled to one another, the variables x and l in the formulae for the CPP signal and for the OPP signal are in each case the same.

The following equation must be satisfied in order to compensate for the component 1; which is dependent on the lens movement:

$$DPP_l = CPP_l - K*OPP_l = 0 \quad (4)$$

In this case, the index "l" in each case denotes that component of the corresponding signal which is dependent on the lens movement. Taking account of the above formulae (2) and (3), the weighting factor for compensation for the component which is dependent on the lens movement is as follows:

$$K = 0.5 \quad (5)$$

This weighting factor K is independent of the alignment of the secondary beams with respect to the main beam. Normally, the aim is to maximize the tracking error amplitude by setting the distance $\Delta x$ appropriately. This is achieved in the evaluation of the above formulae (1) to (3) with K=0.5, provided that the following relationship is valid:

$$\cos\left(\pi * \frac{\Delta x}{p}\right) = -1 \quad (6)$$

Since the cosine function is periodic, this applies to:

$$\Delta x = (2n+1)*p \text{ where } n = 0, 1, 2, \ldots \quad (7)$$

It follows from the formulae (1) to (3) that, when using a new weighting factor G with a negative mathematic sign, that is to say when the subtraction of the OPP signal from the CPP signal is replaced by addition of these two signals, only that component which is dependent on the lens movement is obtained, while the individual tracking error components cancel one another out. In particular, the following relationship must be satisfied in order to compensate for the tracking error components:

$$DPP_x = CPP_x - G*OPP_x = 0 \quad (8)$$

In this case, the index "x" denotes the component of the respective signal which is dependent on the tracking error. The relationship in (8) is satisfied, taking into account the above relationships (2) and (3), when:

$$DPP_x = a * \sin\left(\pi * \frac{x}{p}\right) * \left(1 - 2G\cos\left(\pi * \frac{\Delta x}{p}\right)\right) \equiv 0 \quad (9)$$

The component of the DPP signal which is dependent on the tracking error can thus be eliminated as a function of $\Delta x$ and p when:

$$1 - 2G\cos\left(\pi * \frac{\Delta x}{p}\right) = 0 \quad (10)$$

Assuming that the distance between the secondary beams and the main beam is $\Delta x = p$, then:

$$G = -0.5 \quad (11)$$

The negative mathematical sign of the weighting factor G in formula (11) indicates that the subtraction must be replaced by an addition process. If the secondary beams are arranged on $\Delta x = p$, it is thus sufficient to use the addition of the CPP and OPP signals in order to make the tracking error component become zero and obtain the component which is dependent on the lens movement. G=−0.5, that component which is dependent on the lens movement is obtained as follows by substitution of $\Delta x = p$ in the formulae (1) to (3):

$$DPP_l = 2kl \quad (12)$$

The signal obtained in this way contains only the component which is dependent on the lens movement, and this is referred to as the LCE (lens center error).

FIG. 1 shows a corresponding arrangement for production of the component which is dependent on the lens movement, or of the corresponding lens position signal LCE by use of the DPP method. This is based on the assumption that the photodetector unit 9 has a photodetector unit 12 with four photosensitive surfaces A-D for detection of the reflected main beam, while respective photodetector elements 11, 13 with only two photo-sensitive surfaces E1, E2 and F1, F2, respectively, are provided for detection of the reflected secondary beams. As can be seen from FIG. 1, an amplifier with a variable gain factor G is provided, in order to set the weighting of the secondary beam error signal OPP with respect to the main beam error signal CPP. In order to allow the lens position to be measured while the optical recording medium 7 is being played back, it is necessary to simultaneously form the tracking error signal DPP from the difference between the signal elements CPP and OPP, and the lens position signal LCE from the sum of signal elements CPP and OPP. For this reason, FIG. 1 also includes a signal path which produces the tracking error signal DPP. Since, in this case, both signals are available at the same time, the tracking control loop can be closed, and the information about the lens position can at the same time be used to readjust the coarse tracking motor CTM of the optical scanner 21.

If the distance $\Delta x$ between the secondary beams and the main beam is not $\Delta x = p$ but, for example, is $\Delta x = 3/4p$, then the weighting factor G which leads to compensation of the tracking error component is, according to formula (10):

$$G = -\frac{1}{\sqrt{2}} \quad (13)$$

In this case, not only the mathematical sign but also the magnitude of the optimum weighting factor K for production of the tracking error signal differ from those for the weighting factor G which is required for production of the lens position signal. The weighting factor K for suppression of the component which is dependent on the lens movement is ideally always 0.5, while the weighting factor for compensation of the tracking error component is always negative, but must be matched to the position of the secondary beams. In consequence, the arrangement shown in FIG. 1 has the capability to provide the weighting factor that is used for production of the lens position signal LCE such that it can be adjusted variably.

If a variably adjustable weighting factor is provided, secondary beam separations $\Delta x$ other than those mentioned above can also be used in conjunction with the DPP tracking error method. In theory, it is possible to use track separation in the range $p/2 < \Delta x < 3p/2$. The limits $p/2$ and $(3/2)*p$ cannot be used in practice since the tracking error element in the signal component OPP becomes zero in this case, and it would be impossible to compensate for the tracking error element of the CPP signal even with G infinitely large. As a special case, the sum of the signals OPP1 and OPP2 may be used on its own in this case to obtain a lens position signal. If no tracking error signal is formed on the basis of the DPP method, then the lens position signal can also be formed for any desired adjacent track separations $\Delta x$. The limits in this case are $\Delta x = 0$ or Δx=2·n·p, since the components of the signal elements CPP, OPP1 and OPP2 which are dependent on the tracking error are in this case in phase, and no compensation can be achieved for these components. Furthermore it should be noted that the mathematical sign of the weighting factor G is reversed for 0<Δx<p/2 and for 3p/2<Δx<2p.

The present invention is now based on the object of describing a method and an appliance for adjusting the weighting factor G as described above such that a lens position signal can be formed in which the push-pull signal components are suppressed as far as possible. As described, the weighting factor G in this case depends on the track position of the secondary beams and on the optical storage medium being scanned. Since these parameters are subject to certain tolerances both for the optical scanning unit and for the optical storage medium, such adjustment must be carried out on an individual basis.

A method by means of which the weighting factor G can be determined in a suitable manner will be explained with reference to the following exemplary embodiment.

FIG. 4 shows a signal diagram which illustrates the component of the LCE signal that is dependent on the tracking error for different settings of the weighting factor G. In addition, the tracking error signal DPP is shown by way of example. FIGS. 4B and 4C show the effect of an incorrectly set weighting factor on the production of an LCE signal, as a function of the track position. In this case, the signal profiles of the individual signals are shown as a function of the track position x. The components of the respective scanning beam which are dependent on the track position typically have a zero crossing at the respective track centers L or G, while they have a maximum amplitude at the limits between G and L.

The signal DPP likewise has a zero crossing at the groove center and at the land center. The greatest amplitudes occur at the limits between G and L. If the main beam component CPP in the signal LCE is too strongly weighted in comparison to the secondary beam components OPP, then the resultant signal LCE contains a component which is dependent on the tracking error, and which is in phase with the signal DPP. If, in contrast, the secondary beam components OPP are excessively weighted in comparison to the main beam component CPP, then the signal LCE contains a component which is dependent on the tracking error and is in antiphase to DPP.

In order to ensure that the LCE signal no longer contains any component that is dependent on the tracking error, the weighting factor between the main beam signal and the secondary beam signal must be set correctly.

In order to carry out a first adjustment method, it is necessary to move the scanning beam relative to the tracks, so as to pass through the various track positions, as shown in FIG. 4. This can be achieved by activating the focus control loop for the reader or playback device, and by moving the focusing objective lens so as to move the scanning beam relative to the tracks (FIG. 5). The tracking control loop is not yet activated at this stage. If, by way of example, the objective lens is moved transversely with respect to the tracks by means of a sinusoidal drive voltage, then the LCE signal has a desired component which is proportional to the movement of the objective lens and is evident in the envelope (FIGS. 5A-C) of the signal LCE, as well as an undesirable component which is dependent on the tracking error and which—analogously to FIG. 4—is dependent on the setting for the weighting. As in FIG. 4B, the LCE signal in FIG. 5A has a component which is in phase with the DPP when the main beam is too strongly weighted. An antiphase component as in FIG. 5B results if the secondary beam component is excessively weighted. If the weighting is correct, as shown in FIG. 5C, all that remains in the LCE is the component which corresponds to the movement of the objective lens. The LCE signal may be high-pass filtered in order to separate the component which is dependent on the tracking error and which may still be present from the movement component.

The eccentricity that normally occurs in the optical storage medium results in the scanning beam being moved relative to the tracks even without any movement of the objective lens caused by a drive voltage.

The first adjustment method comprises the amplitudes of the components of the secondary beams which are dependent on the tracking error and of the components of the main beam which are dependent on the tracking error being determined as they occur when passing through the various track positions, and with the tracking control loop deactivated, and the weighting factor being calculated and set such that the components of the LCE signal which are dependent on the tracking error become zero.

This is done by determining the amplitude of the sum of the normalized secondary beam error signals with the aid of a first peak value detector PD1, and by determining the amplitude of the normalized main beam error signal with the aid of a second peak value detector PD2. An evaluation unit/weighting calculation unit AC, IC compares the amplitudes, and uses the result to calculate a weighting factor as shown in FIG. 6. The sum of the secondary beam error signals is then subtracted from the main beam error signal using the determined weighting factor.

One precondition in this case is that the weighting factor can be calculated from the amplitudes.

An alternative method comprises the measurement of the amplitudes of the weighted and possibly already normalized main and secondary beam error signals and, if there is a difference, increasing the weighting factor of the weaker signal, and/or reducing that of the stronger signal. This can be carried out by means of an iterative process, which includes a number of measurement cycles and is ended when the difference between the amplitudes falls below a predetermined value. The limit which the value must fall below is defined by means of a window comparator.

Both of the methods described above are dependent on the amplitude measurement producing a reliable result, from which the next weighting step can be determined reliably. However, since both the main beam signal and the secondary beam signals are in practice subject to noise and interference, the measured amplitude values should be averaged in order to achieve sufficient adjustment accuracy.

A second adjustment method is to multiply the signal LCE by a suitable signal which, for example, in each case has its greatest amplitude between the tracks and has a zero crossing at G or on a land, see FIG. 4D. An inverted response of a suitable signal such as this can also be used. Any tracking error signal is suitable for this purpose, that is to say, for example, the three-beam tracking error signal or else the DPP tracking error signal.

Since the DPP tracking error signal can advantageously be formed for the track positions as described above, it is preferably used in order to multiply it by the signal LCE, see FIG. 7. Both of the signals are advantageously subjected to high-pass filtering as well before the multiplication process, in order to suppress any low-frequency components in the signals DPP and LCE. Depending on the weighting that has been set, see FIGS. 7A and 7B, a pulsating DC voltage is produced at the output of the multiplier, whose mathematical sign represents the phase, and whose mean or peak value represents the magnitude of the component of the LCE signal that is dependent on the tracking error. The aim is to set the weighting such that the value of this pulsating DC voltage tends as far as possible to zero, see FIG. 7C. This is checked, for example, by means of a window comparator shown as WC in FIG. 8, whose comparison voltages VT1, VT2 are set to values which can be predetermined. In this case, these comparison values VT1, VT2 should be chosen to be just sufficiently small that the pulsating DC voltage is sufficiently small and the resultant setting of the weighting that is associated with it is within predetermined limits. The outputs of the window comparator WC indicate whether the correct setting for the weighting has already been found (value of the product from the multiplier MUL within the window), or whether the weighting must be adjusted in favor of the main beam component (value below the window) or the secondary beam component (value above the window), see FIG. 7. The window comparator WC may be preceded by an averager AV, in order to average the pulsating DC voltage over a predetermined number of cycles.

By way of example, a control circuit IC evaluates the output signals from the window comparator WC after a predetermined number of cycles of the signal DPP and in the next step, controls the adjustment of the weighting. This adjustment process can be carried out as a step-by-step approximation or iteration to the correct value of the weighting, as shown in FIG. 8, using an up/down control signal UD and a step signal ST as input to a step generator STG. Alternatively, the next weighting setting may be calculated on the basis of a gradient calculation using a step slope determination SSD and a step size calculation and control SSCC, as shown in FIG. 9. The control circuit IC, SSCC repeats these adjustment steps until the mean or peak value of the product of the LCE and DPP is within predetermined values.

A further and particularly advantageous variant for adjustment of the weighting factor will be described in the following text using FIG. 10. The use of this variant is likewise based on the assumption that the focus controller FC is already activated and that the scanning beam is being moved relative to the tracks on the optical storage medium. Here, too, a multiplier MUL is used for multiplying the LCE signal after optional high-pass-filtering in HPF1 by the DPP signal also optionally high-pass-filtered in HPF2. The output signal from the multiplier MUL is then integrated by means of an integrator INT. As one particular characteristic, the integrator INT has a reset input which results in the integration voltage starting from the value zero when a drive R is applied to this reset input. The output signal of the integrator INT is then connected to a window comparator WC, whose comparison voltages VT1, VT2 are set to values which can be predetermined. The outputs of the window comparator WC indicate whether the correct setting of the weighting has already been found (value of the product within the window), or whether the weighting must be adjusted in favor of the main beam component (value below the window) or of the secondary beam component (value above the window). After a predetermined time, a control circuit IC evaluates the respective output signals from the window comparator WC, and adjusts the setting of the weighting appropriately. The control circuit IC then sets the integrator INT to zero, before a new time-controlled measurement cycle starts. A predetermined number of track crossings of the scanning beam are taken into account within the predetermined time in each measurement cycle in order to form the product of LCE and DPP. After the predetermined measurement time, the integration process, which starts with the value zero, produces an integration value which corresponds to the average value of the product of LCE and DPP, and thus corresponds to the weighting error. The predetermined comparison voltages VT1, VT2 of the window comparator WC must be chosen to be just sufficiently small that the integration value is sufficiently small and the resultant setting of the weighting that is associated with it is within predetermined limits.

The weighting can be set as a step-by-step approximation or iteration to the correct value, using a step generator STG as shown in FIG. 10. Alternatively, the next weighting setting can be calculated on the basis of a gradient calculation. The control circuit IC repeats these adjustment steps until the integration value of the product of LCE and DPP is within predetermined values. The advantage of the second variant is that a greater number of track crossings of the scanning beam can be taken into account within the predetermined measurement time in order to form the product of LCE and DPP. Any noise or interference components are averaged out by the use of the integration process.

As an alternative to pure time control of the measurement cycle, the measurement cycle can also be matched to the rotation of the optical storage medium. For example, one measurement cycle may last for a fraction of a revolution or else for two or more revolutions of the optical storage medium.

A third variant once again makes use of a multiplier MUL in order to multiply the (optionally high-pass-filtered in HPF1) LCE signal by the (likewise optionally high-pass-filtered) DPP signal. Alternatively, the (optionally high-pass-filtered) DPP signal, which typically has a sinusoidal profile, can be converted to binary form before multiplication, in which case the outputs of the binarizer are +1 or −1. The multiplier MUL then multiplies the LCE signal by +1 or −1, once again resulting in a pulsating DC voltage, whose mathematical sign represents the phase, and whose amplitude represents the magnitude, of the component of the LCE signal which is dependent on the focus offset. The output signal from the multiplier is integrated by means of an integrator INT, which changes its output voltage until the value of the multiplication becomes zero. This is in fact the situation when the optimum weighting factor is reached. If the output voltage of the integrator is accordingly linked by means of an adjustment circuit to the weighting setting, then this results in a control loop which is automatically set, by virtue of the integrator in the feedback path, such that the input signal to the integrator becomes zero. This is actually the situation when the correct weighting is set, and the output signal from the multiplier becomes zero.

Of the described first adjustment method the last two variants in particular make it possible to determine the weighting factor relatively accurately. All variants can advantageously be carried out by means of digital signal processing or by means of a digital signal processor. One precondition for carrying out the stated adjustment method is that the scanning beam moves relative to the tracks on the optical storage medium, with the tracking controller TC typically being deactivated.

The process of determining the weighting factor on the basis of an adjustment method such as this is normally one component within a procedure comprising a number of adjustment steps, which are carried out after the appliance has been switched on in order to read from or write to an optical storage medium. These adjustment steps are carried out before, for example, a reading or writing process is started.

Further adjustment methods, which work even while reading or writing, will be described in the following text.

A first method for setting the weighting factor, and which may be carried out while reading or writing, will be described in the following text. The use of this method is once again based on the assumption that the focus controller is already activated. In addition, the tracking controller TC is likewise already activated and ensures that the main scanning beam is moved along the center of a predetermined track (G or L). Generated by a lens move generator LMG, a modulation signal M is fed into the closed tracking control loop at an addition point AP. This modulation signal M is advantageously sinusoidal and is at an amplitude which modulates the operating point of the tracking controller TC by, for example, 10% of its maximum control range. This means that the components (which are dependent on the tracking error) of the signals of the detector segments which are associated with the scanning beams are modulated by about 10% of their maximum values. The maximum values are in this case given by the peak-to-peak amplitude of the tracking error signal as the scanning beam is moved transversely with respect to the tracks. This relationship is illustrated in FIGS. 11 and 12. By way of example, the tracking error signal DPP has an amplitude A of 1V, for a distance of 0.74 μm between L(n) and L(n+1).

The profile of the tracking error signal close to the center of the track G is approximately linear, and can be calculated by the following approach. In this case, U is the tracking error signal, A is the amplitude, x is the track position at which the gradient is intended to be determined, and p is the track separation:

$$U = A * \left[-\sin\left(\frac{2\pi x}{p}\right)\right]$$

The gradient corresponds to the derivative:

$$\frac{dU}{dx} = U'$$
$$= \frac{2\pi}{p} A * \left[-\cos\left(\frac{2\pi x}{p}\right)\right]$$

If x is set to the value p/2 in order to calculate the gradient at the zero crossing (which corresponds to the groove center), then it results in:

$$\frac{dU}{dx} = U' = \frac{2\pi}{p} A * \left[-\cos\left(\frac{2\pi * x}{p}\right)\right]$$
$$\frac{dU}{dx} = U' = \frac{2\pi}{p} A * \left[-\cos\left(\frac{2\pi * p/2}{p}\right)\right]$$
$$\frac{dU}{dx} = U' = \frac{2\pi}{p} A * [-\cos(\pi)]$$
$$\frac{dU}{dx} = U' = \frac{2\pi}{p} A$$

The gradient U' is accordingly dependent only on the track separation and on the associated amplitude A. The gradient may be quoted in [V/μm]. If the amplitude A is set to 1V, and the track separation p to 0.74 μm, then this results in a gradient of 8.49 V/μm.

If the tracking error signal DPP has, for example, an amplitude A of 1V (which corresponds to 2 Vpp) with a track separation of 0.74 μm, and if the modulation signal M whose amplitude M is, by way of example, 100 mV (which corresponds to 200 mVpp) is added to the tracking error signal DPP at the input of the tracking controller TC, then the movement of the scanning beam can be calculated by multiplying the reciprocal of the gradient by the amplitude of the modulation signal.

$$\frac{dU}{dx} = U' = \frac{2\pi}{p} A$$
$$\frac{dx}{dU} = \frac{1}{U'} = \frac{p}{2\pi * A}$$

If the modulation M is inserted into the reciprocal of the gradient:

$$\Delta x = \frac{p}{2\pi * A} * M$$
$$\Delta x = \frac{0.74 \text{ μm}}{2\pi * 1 \text{ V}} * 0.1 \text{ V}$$
$$\Delta x = 11.777 \text{ nm}$$

A modulation signal with an amplitude M of +/−100 mV (which corresponds to 200 mVpp) accordingly moves the scanning beam by Δx=+/−11.777 nm.

The tracking error signal DPP is itself composed of the difference between the main beam tracking error signal CPP and the added secondary beam tracking error signal OPP. Since the secondary beams scan the complementary track to the main beam, the gradient for the secondary beam tracking error signal OPP is the inverse of the gradient of the main beam tracking error signal CPP. The resultant DPP signal in the calculation shown in FIGS. 11A, 12A has an overall gradient with the same mathematical sign as the CPP signal.

The LCE signal is formed by multiplying the main beam tracking error signal CPP by, for example, a weighting of (1+G), and the sum of the secondary beam tracking error signals OPP by a weighting (1−G). The selected setting for the weighting in consequence has a proportional effect on the gradient of both of the signals (CPP', OPP') which are obtained by multiplication by the weighting factors, and are subsequently added to give the LCE signal. After the addition of CPP' shown in FIGS. 11B, 12B and OPP' shown in FIGS. 11C, 12C to form the LCE signal shown in FIGS. 11D, 12D, the mathematical sign of the gradient and the magnitude of the gradient of any remaining tracking error component are thus dependent on the setting of the weighting. To be more precise, the gradient of the remaining tracking error component will be proportional to the difference between the gradients CPP' and OPP'. If, by way of example, the main beam tracking error signal CPP is too strongly weighted, then the LCE signal has a remaining tracking error component whose gradient has the same mathematical sign as that of the tracking error signal DPP, see FIG. 11D. If, in contrast, the secondary beam tracking error signal OPP is too strongly weighted, then the LCE signal has a remaining tracking error component whose gradient has the opposite mathematical sign to that of the tracking error signal DPP, see FIG. 12D.

FIGS. 11E-G and FIGS. 12E-G show the effect of modulation M on the track position Δx of the scanning beams about the respective track center, and the effect on the signal LCE. The tracking error components caused in the signal LCE by the modulation M are in phase with or in antiphase with the modulation M depending on the selected weighting, so that the correct setting of the weighting between CPP and OPP can be determined from the phase angle and amplitude of the tracking error components in the signal LCE with respect to the modulation signal M.

A synchronous demodulator may advantageously be used in order to determine the correct setting of the weighting from the phase angle and from the amplitude of the tracking error components in the signal LCE.

In this case, as an alternative to the use of a weighting factor G for the secondary beam error signals or of a weighting factor G' for the main beam error signals, the weighting factor can advantageously be split between the two signal paths (1+G; 1−G), as is shown in the signal diagrams in FIG. 11, FIG. 12 and in the exemplary embodiments in FIG. 13 and FIG. 14. This splitting of the weighting factor results in the amplitude of the signal LCE being less dependent on the setting of the weighting factor.

In a first exemplary embodiment shown in FIG. 13, the synchronous demodulator comprises a multiplier MUL, an averaging unit AV and a control circuit IC for the weighting factor. The multiplier MUL, which multiplies the lens position signal LCE by the modulation signal M generated in the modulation generator MODG, produces a pulsating DC voltage, whose polarity depends on the phase between the input signals to the multiplier MUL, and whose mean value depends on the magnitude of the amplitude of the lens position signal LCE. The control circuit IC for the weighting factor evaluates the polarity of the mean value that is formed, and changes the weighting factor in steps in a direction that is derived from the polarity. This is done in a number of iterative steps using a step generator STG controlled by an up/down signal UD and a step signal ST, until the magnitude of the mean value is within a predetermined limit value. This is normally done by using a window comparator WC, whose comparison voltages VT1, VT2 are predetermined. Since the mean value should ideally become zero when the weighting is correctly set, the comparison voltages VT1, VT2 should be chosen to be sufficiently small so that the optimum weighting factor is found with sufficient accuracy. Instead of evaluating the mean value, it is also possible to evaluate the amplitude as a criterion for the correct weighting factor having been reached. Alternatively, by way of example, it is also possible to use the tracking error signal DPP for multiplication by LCE, as indicated by the dotted line B in FIG. 13, rather than to use the modulation signal M as indicated by the dotted line A.

Since the magnitude of the mean value is approximately proportional to the adjustment error of the weighting factor, it is possible to reduce the number of iterative adjustment steps which lead to the optimum weighting factor. If, for example, the quotient of the weighting step to the mean value (that is to say the gradient) is known, then this can be used to calculate the next weighting step from this gradient, thus reducing the number of steps to reach the optimum weighting factor.

Figure 14A:
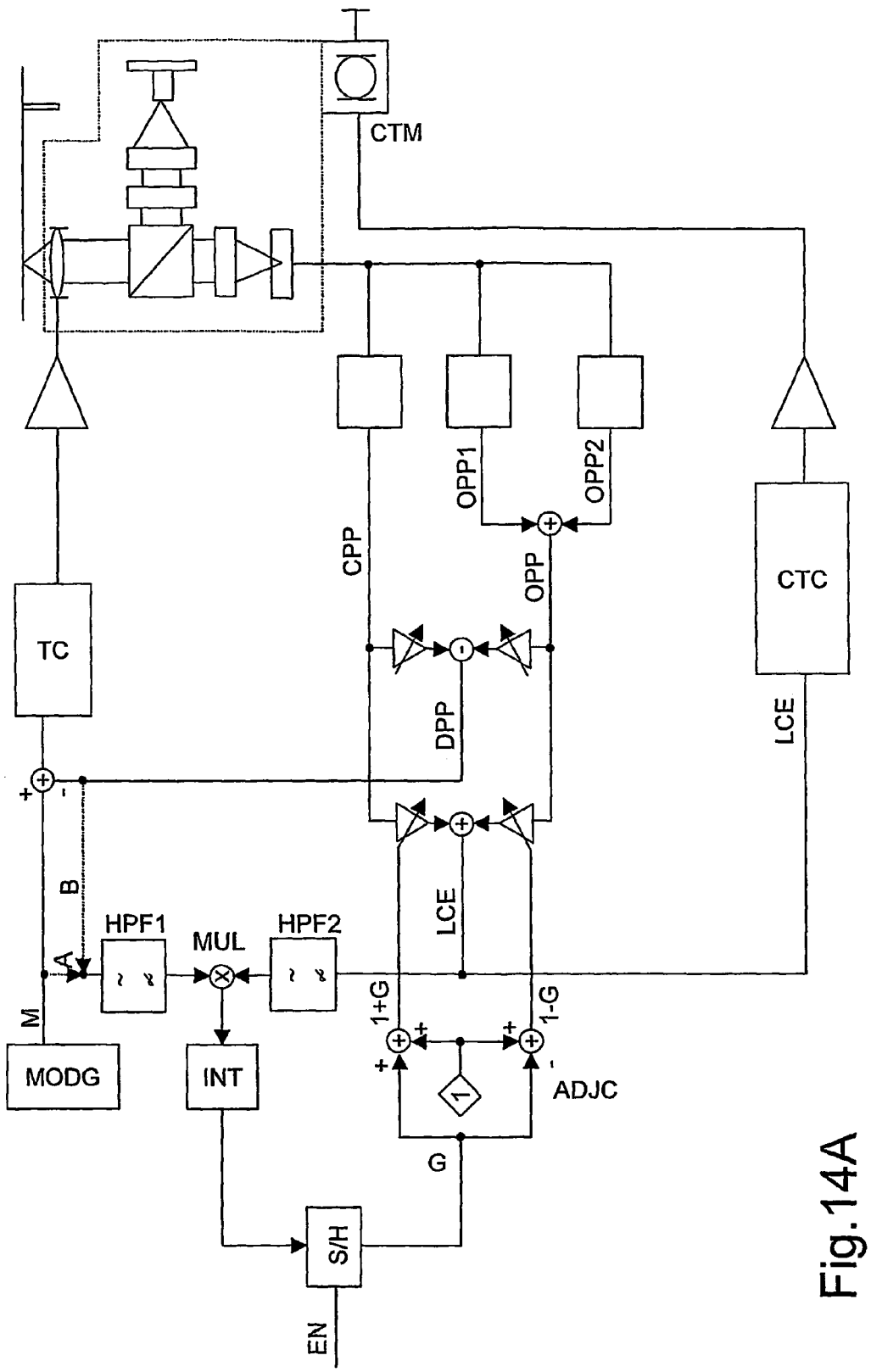
Figure 14B:
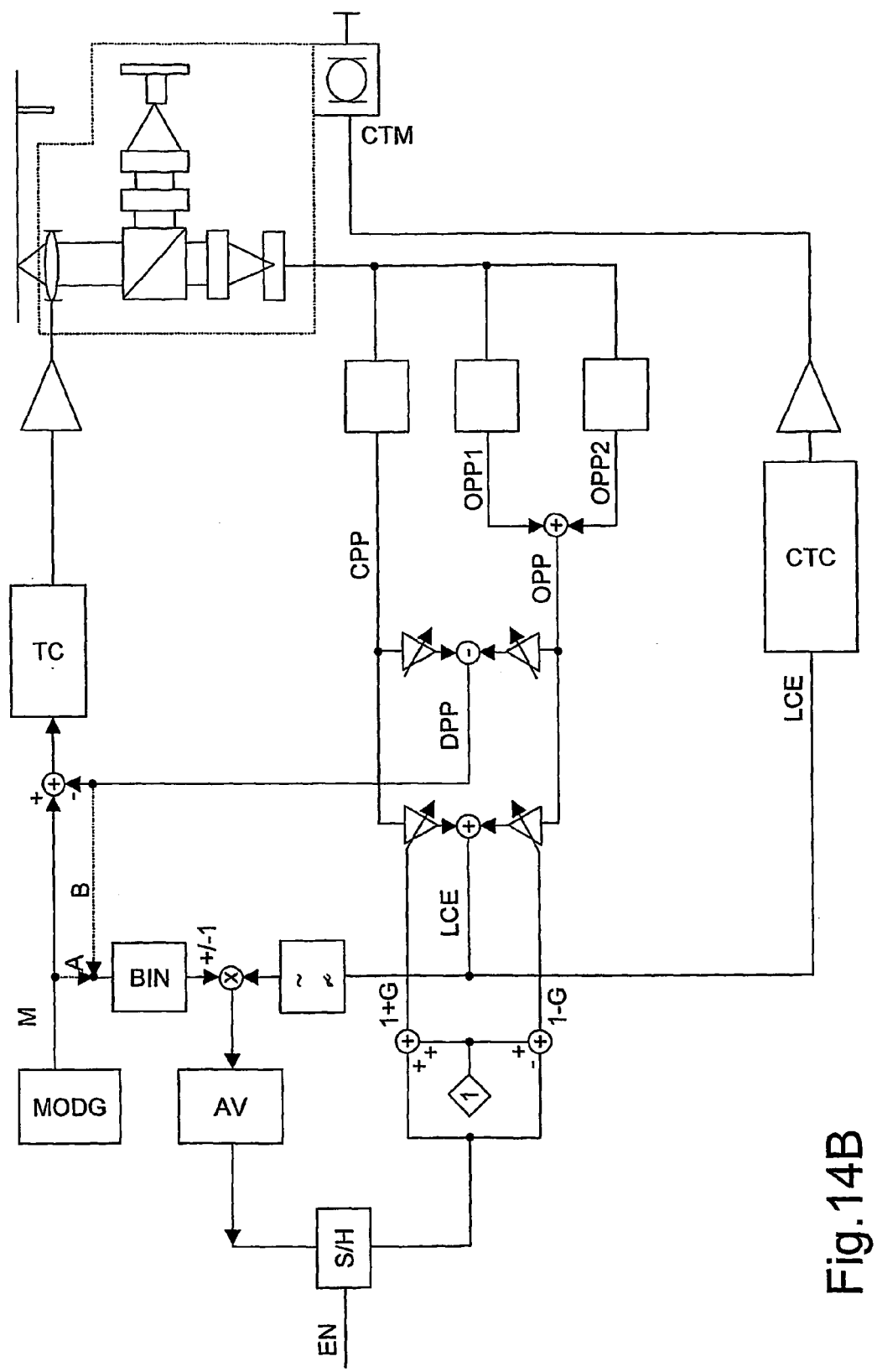

In a second exemplary embodiment shown in FIG. 14A, the synchronous demodulator comprises a multiplier MUL, an integrator INT and an adjustment circuit ADJC for the weighting factor. In this case, by way of example, the typically sinusoidal interference signal M may be filtered as shown in FIG. 14A or converted into binary form by a binarizer BIN as shown in FIG. 14B before the multiplication process, when the outputs of the binarizer BIN being +1 or −1. The multiplier MUL then multiplies the output signal from the subtractor by +1 or −1, once again resulting in a pulsating DC voltage, whose polarity depends on the phase between the input signals of the multiplier MUL, and whose mean value depends on the magnitude of the amplitude of the output signal from the subtractor. The integrator INT which follows the multiplier MUL changes its output voltage until the value of the multiplication becomes zero. This actually occurs when the optimum weighting factor is reached. Accordingly, if the output voltage from the integrator INT is linked to the weighting setting by means of an adjustment circuit, then this results in a control loop, which is automatically set by the integrator INT in the feedback path such that the input signal to the integrator INT becomes zero.

Alternatively, by way of example, it is also possible to use the tracking error signal DPP for multiplication by LCE, as shown by the dotted line B in FIG. 14, instead of using the modulation signal M, as shown by dotted line A.

As has already been mentioned in the introduction, the above analyses have for simplicity been based on the assumption that the intensities of the three scanning beams under consideration are the same when they strike the photodetector unit 9. The stated compensation factors G and K are therefore valid only when this simplification is used.

The invention claimed is:

1. A method for production of a lens position signal in a scanning unit for optical recording media having data recorded in tracks, with the scanning unit having an objective lens, which can assume different positions relative to the scanning unit, and a tracking control loop, producing an optical main beam and at least one secondary beam, with the main and secondary beams being focused on the recording medium, with the light that is reflected from the recording medium being evaluated by means of two or more photodetector which are associated with the beams, with a first error signal being derived from the signals of the photodetector segments which are associated with the main beam, and with a second error signal being derived from the signals of the photodetector segments which are associated with the secondary beams, and with the lens position signal being formed in the method by combination of the first error signal multiplied by a first branch weight (1+G) and the second error signal multiplied by a second branch weight (1−G, G); comprising:

scanning of the optical recording medium in a way that a position of the beams on the recording medium varies relative to the track, measuring a first measurement signal, which contains in a first proportion a first signal component depending on the position of the objective lens relative to the scanning unit and a second signal component depending on the position of the scanning beam relative to the tracks on the recording medium, measuring a second measurement signal, which contains the first signal component and the second signal component in a second proportion different from the first proportion, evaluation of the measurement signals, adjustment of the branch weights (G, 1+G, 1−G) controlled by the result of the evaluation.

2. The method as claimed in claim 1, which is used with the tracking control loop switched on, with a deflection signal being fed into the tracking control loop, with a tracking error component which is contained in the lens position signal and is caused by the deflection signal being extracted, and with the correct selling for the branch weights (G, 1+G, 1−G) being determined from the phase angle and the amplitude of the tracking error component.

3. The method as claimed in claim 2, in which the tracking error component is used as an evaluation signal, and the branch weights (G, 1+G, 1−G) are changed in iterative adjustment steps as a function of the mathematical sign of the evaluation signal until The value of the evaluation signal is between a lower and an upper comparison value.

4. The method as claimed in claim 3, with the magnitude of the change in the branch weights (G, 1G, 1−G) in each adjustment step being determined as a function of the value of the evaluation signal in the previous adjustment step.

5. The method as claimed in claim 2, in which the tracking error component is integrated, and the branch weights (G, 1+G, 1−G) are formed from the output signal of the integration.

6. The method as claimed in claim 1, which is used with the tracking control loop switched off.

7. The method as claimed in claim 6, with the objective lens being moved transversely with respect to the tracks.

8. The method as claimed in claim 6, in which the first measurement signal is formed from the first error signal, the second measurement signal is formed from the second error signal, the amplitudes of the measurement signals are evaluated, and The branch weights (G, 1−G, 1−G) are calculated from the measured amplitudes such that the components of the lens position signal which are dependent on the tracking error become zero.

9. The method as claimed in claim 6, in which the first measurement signal is formed from the first error signal multiplied by the first branch weight (1+G), the second measurement signal is formed from the second error signal multiplied by the second branch weight (1−G, G), the amplitudes of the measurement signals are evaluated and, if the amplitudes differ, the branch weights (G, 1+G, 1−G) are changed in at least one adjustment step such that the difference between the amplitudes is reduced.

10. The method as claimed in claim 6, in which the first measurement signal is formed from the lens position signal, the second measurement signal is formed from a tracking error signal, an evaluation signal is formed from the product of the two measurement signals, the evaluation signal is evaluated by comparison with a comparison interval, and, if the evaluation signal is not within the comparison interval, the branch weights (G, 1+G, 1−G) are changed in at least one adjustment step such that the evaluation signal is changed in the direction of the comparison interval.

11. The method as claimed in claim 10, with the formation of the evaluation signal comprising an integration process, and a sequence controller being provided, which resets the result of integration to zero before each measurement.

12. The method as claimed in claim 11, with the formation of the second measurement signal including conversion to binary form.

13. A scanning unit for scanning optical recording media having data recorded in tracks, the scanning unit comprising:
   an objective lens that can assume different positions relative to the scanning unit,
   means for producing an optical main beam and at least one secondary beam,
   means for focusing the main and secondary beams onto the recording medium,
   two or more photodetector segments associated with the beams which evaluate the light that is reflected from the recording medium,
   means for deriving a first error signal from the signals of the photodetector segments which are associated with the main beam, and a second error signal from the signals of the photodetector segments which are associated with the secondary beams, and for forming a lens position signal by combination of the first error signal multiplied by a first branch weight and the second error signal multiplied by a second branch weight;
   means for scanning the optical recording medium with the main beam not guided exactly on a track center and for measuring two measurement signals which are formed differently and include information regarding the position of the objective lens relative to the scanning unit and regarding the position of the scanning beam relative to the tracks on the recording medium; and
   means for evaluating the measurement signals and for adjusting the branch weights controlled by the result of the evaluation.

* * * * *